United States Patent
Fenney et al.

(10) Patent No.: US 12,236,518 B2
(45) Date of Patent: Feb. 25, 2025

(54) METHOD OF TRAVERSING A HIERARCHICAL ACCELERATION STRUCTURE

(71) Applicant: Imagination Technologies Limited, Kings Langley (GB)

(72) Inventors: Simon Fenney, Hertfordshire (GB); Gregory Clark, Hertfordshire (GB); Joseph John Davison, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 111 days.

(21) Appl. No.: 18/072,023

(22) Filed: Nov. 30, 2022

(65) Prior Publication Data
US 2023/0252718 A1    Aug. 10, 2023

(30) Foreign Application Priority Data

Nov. 30, 2021  (GB) ..................................... 2117303

(51) Int. Cl.
*G06T 15/06* (2011.01)
*G06T 1/20* (2006.01)

(52) U.S. Cl.
CPC .............. *G06T 15/06* (2013.01); *G06T 1/20* (2013.01); *G06T 2210/21* (2013.01)

(58) Field of Classification Search
CPC ......... G06T 15/06; G06T 15/00; G06T 15/08; G06T 17/00; G06T 1/20; G06T 2210/21;
(Continued)

(56) References Cited

U.S. PATENT DOCUMENTS

| 8,264,484 B1 | 9/2012 | Lauterbach et al. |
| 8,284,188 B1 | 10/2012 | Lauterbach et al. |

(Continued)

FOREIGN PATENT DOCUMENTS

| EP | 3435335 A1 | 1/2019 |
| EP | 3435336 A1 | 1/2019 |

OTHER PUBLICATIONS

Huang et al., "Ray Tracing Acceleration with Multiple Projection Planes," ACCV '95 Second Asian Conference on Computer Vision, Singapore, II-225-II-229; Dec. 1995.

(Continued)

*Primary Examiner* — Vijay Shankar
(74) *Attorney, Agent, or Firm* — Potomac Law Group, PLLC; Vincent M DeLuca

(57) ABSTRACT

A hierarchical acceleration structure for use in a ray tracing system. When generating a node for the hierarchical acceleration structure, the primitives in a particular portion of the 3D scene may be alternatively bounded by different shaped volumes. These bounding volumes or 'bounding regions' can be Axis Aligned Bounding Boxes (AABBs), although other bounding volumes can be used. The ray tracing system may use sets of two or more bounding volumes in a 3D scene to bound all the primitives within that portion. The choice of how to create sets of multiple bounding volumes within a portion of the 3D scene may be done by using a binary space partition (BSP). Different sets of bounding regions may present different amounts of surface area for a hypothetical ray entering the portion of the 3D scene dependent upon the expected ray direction or angle.

20 Claims, 27 Drawing Sheets

(58) Field of Classification Search
CPC ..... G06T 15/005; G06T 15/10; G06T 15/503; G06T 17/005; G06T 17/05; G06T 17/10; G06T 17/20
See application file for complete search history.

(56) References Cited

U.S. PATENT DOCUMENTS

| | | | |
|---|---|---|---|
| 11,238,640 B2* | 2/2022 | Saleh | G06T 15/06 |
| 11,302,056 B2* | 4/2022 | Muthler | G06T 15/005 |
| 11,380,041 B2* | 7/2022 | Muthler | G06T 15/08 |
| 11,816,792 B2* | 11/2023 | Chajdas | G06T 15/06 |
| 2021/0390755 A1 | 12/2021 | Muthler et al. | |
| 2021/0390757 A1* | 12/2021 | Muthler | G06T 15/005 |

OTHER PUBLICATIONS

Hunt et al., "Adaptive Acceleration Structures in Perspective Space," IEEE/EG Symposium on Interactive Ray Tracing; Aug. 9-10, 2008, Los Angeles, California, pp. 11-17.

Hunt, "Corrections to the Surface Area Metric with Respect to Mail-Boxing," IEEE/EG Symposium on Interactive Ray Tracing; Aug. 9-10, 2008, Los Angeles, California, pp. 77-80.

Hunt et al., "Ray-Specialized Acceleration Structures for Ray Tracing," IEEE/EG Symposium on Interactive Ray Tracing; Aug. 9-10, 2008, Los Angeles, California, pp. 3-10.

Jones et al., "On Optimality of OBBs for Visibility Tests for Frustum Culling, Ray Shooting and Collision Detection," IEEE Proceedings, Computer Graphics International, Hanover, Germany, Jun. 26, 1998, pp. 1-8.

* cited by examiner

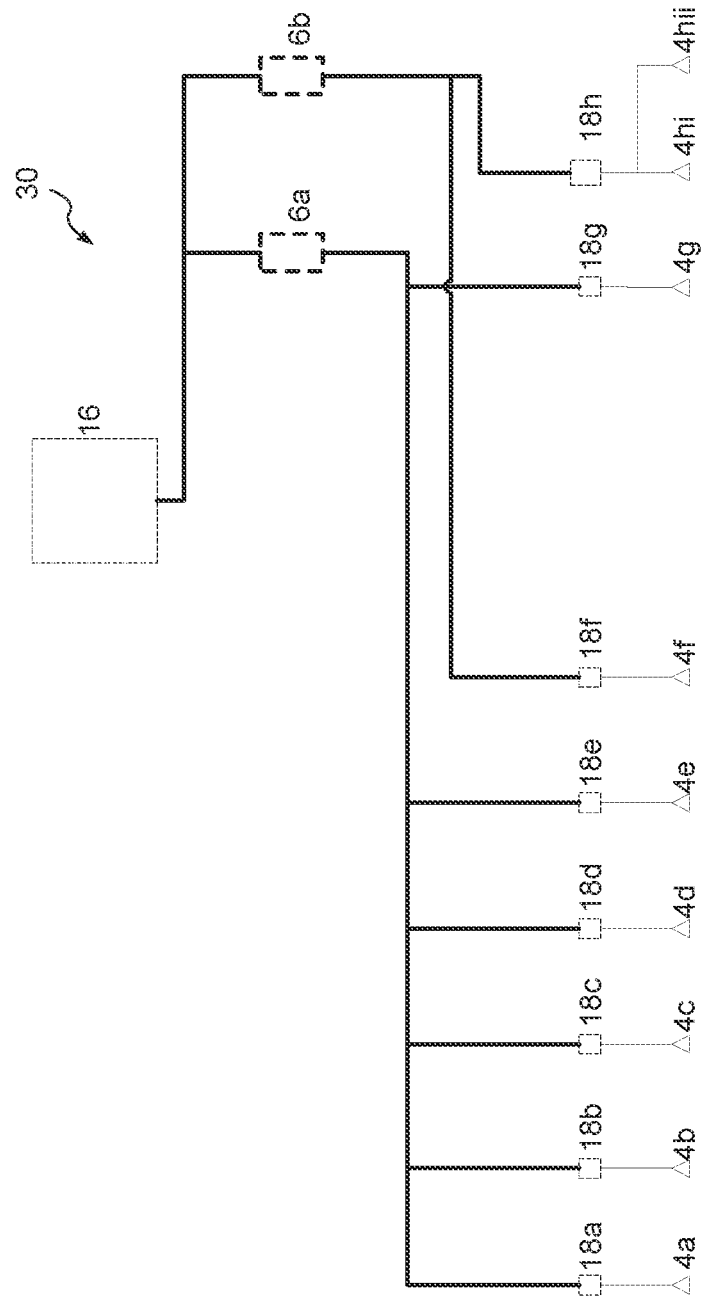

METHOD OF TRAVERSING A HIERARCHICAL ACCELERATION STRUCTURE

FIELD

The present disclosure is directed to acceleration structures in a ray tracing system.

BACKGROUND

Ray tracing is a computational rendering technique for generating an image of a scene (e.g., a 3D scene) often by tracing paths of light ('rays') from the viewpoint of a camera through the scene. Each initial ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e., a portion of computer code) may be executed in respect of the intersection. A programmer can write the shader program to define how the system reacts to the intersection which may, for example cause one or more secondary rays to be emitted into the scene, e.g., to represent a reflection of the ray off the intersected object or a refraction of the ray through the object (e.g., if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

In order to reduce the number of intersection tests that need to be performed, ray tracing systems can generate acceleration structures, wherein each node of an acceleration structure represents a region within the scene. Acceleration structures are often hierarchical (e.g., having a tree structure) such that they include multiple levels of nodes, wherein nodes near the top of the acceleration structure represent relatively large regions in the scene (e.g., the root node may represent the whole scene), and nodes near the bottom of the acceleration structure represent relatively small regions in the scene. A "tree node" refers to a node which has pointers to other nodes in the hierarchical acceleration structure (i.e., a tree node has child nodes in the hierarchical acceleration structure). A "leaf node" refers to a node which has one or more pointers to one or more primitives (i.e., a leaf node does not have child nodes in the hierarchical acceleration structure). In other words, leaf nodes of the acceleration structure represent regions bounding one or more objects in the scene. The acceleration structure can have different structures in different examples, e.g., a grid structure, an octree structure, a space partitioning structure (e.g., a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g., in a recursive manner) using the acceleration structure by first testing the ray for intersection with the root node of the acceleration structure. If the ray is found to intersect a parent node (e.g., the root node), testing can then proceed to the child nodes of that parent. In contrast, if the ray is found not to intersect a parent node, intersection testing of the child nodes of that parent node can be avoided, saving computational effort. If a ray is found to intersect with a leaf node, then it can be tested against the objects within the region represented by the leaf node to thereby determine which object(s) the ray intersects with. If more than one intersection is found for a ray, then the closest of the intersection points to the ray's origin (i.e., the first intersection that the ray encounters in the scene) can be identified and the ray is determined to intersect at this identified closest intersection. The use of an acceleration structure (rather than testing rays directly with objects in the scene) reduces the number of intersection tests that need to be performed and simplifies the intersection tests. The intersection tests are simpler because the nodes of the acceleration structure represent basic shapes (e.g., axis-aligned bounding boxes or spheres) for which intersection tests are simpler than for more complex object shapes, e.g., defined in terms of triangular primitives for which the orientation is not predetermined.

Even though acceleration structures are used in ray tracing systems, rays can still be subject to unnecessary intersection testing when the ray is directed towards an empty space of the bounding box. This unnecessary intersection testing undesirably increases computation burden.

The article by Hunt W. and Mark W. titled 'Ray-Specialized Acceleration Structures for Ray Tracing' in IEEE/EG Symposium on Interactive Ray Tracing 2008, 9-10 Aug., Los Angeles, California, USA, describes ray tracing acceleration structures wherein split planes are chosen that are axis aligned, whether in Euclidean space or in perspective space. An acceleration structure is described, and shown in FIG. 1d of this document, to be built using axis-aligned split planes specified in a space transformed by a perspective projection, wherein FIG. 1d of this document shows non-square scene divisions. In a different figure, this document shows a square scene with two different split plane locations.

U.S. Pat. No. 8,264,484 describes a computer program for organising a plurality of rays. Oriented Bounding Box (OBB) for a group of rays with similar directions is determined. A hierarchy is generated or loaded for an object in a scene. When exemplifying a static object, the hierarchy is computed once.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention, exemplified by methods and systems described herein, relates to ray tracing systems and generating a hierarchical acceleration structure for use in a ray tracing system. When generating a node for a hierarchical acceleration structure, the primitives in a particular portion of the 3D scene may be alternatively bounded by different shaped volumes. These bounding volumes or 'bounding regions' can be AABBs, although other bounding volumes can be used. The ray tracing system described herein may use sets of two or more bounding volumes in a 3D scene to bound all the primitives within that portion. The choice of how to create sets of multiple bounding volumes within a portion of the 3D scene may be done by using a binary space partition (BSP). Different sets of bounding regions may present different amounts of surface area for a hypothetical ray entering the portion of the 3D scene dependent upon the expected ray direction or angle.

Acceleration structures of the prior art may be created with a heuristic cost function to minimise the number of intersection tests. When ray tracing systems of the prior art use a single acceleration structure, the choices made when building the structure are often guided by a heuristic metric—frequently the Surface Area Heuristic (SAH)—which assumes that ray directions are uniformly distributed. Very broadly, the SAH metric states that the expected 'cost' of ray tracing a given bounding volume in the acceleration structure will be the cost of testing the volume plus the probability that volume will be hit multiplied by the sum of the expected costs of ray tracing that volume's children (given that the parent volume was hit). With the SAH, the conditional probability that a given child volume will be hit is the surface area of that (convex) surface divided by the surface area of its (convex) parent.

An example of this process is given for a trivial test scene or model as shown in FIG. 1a. This comprises three pairs of triangle primitives, 4i, 4ii and 4iii, enclosed in an overall bounding volume, 3. Note other examples may use single triangles as primitives or alternative surfaces such as spheres or procedural geometry, or various combinations thereof. Further, note that to avoid cluttering the figures, AABB 3 has been made larger than necessary.

In FIG. 1a's example, for each of the pairs, 4i through 4iii, AABBs, 5a, 5b and 5c respectively, has been determined. To form a hierarchy, which for illustrative purposes in this example will be a binary tree, two of the bounding boxes must be paired, and, in this example, there are three possible choices. One possible such combination is shown in FIGS. 1b, wherein 5a and 5b are paired and a parent AABB, 9, is determined. FIG. 1e illustrates the corresponding binary tree, wherein the 'node' corresponding to AABB 9 references 5a and 5b. The remaining AABB, 5c, is paired with AABB 9 and both are referenced by the node corresponding to the reference number 3.

There are two other options for the arrangement of a binary hierarchy as shown in FIGS. 1f and 1g. In FIGS. 1f, AABBs 5a and 5c are initially grouped forming a new AABB, 7. This is shown spatially in FIG. 1c. Similarly, in FIGS. 1g, AABBs 5b and 5c are paired, producing a new AABB, 11. This arrangement in shown in FIG. 1d.

The choice of which AABBs to group can have a major effect on the rendering performance of the ray tracer and so a heuristic, such as the SAH, is frequently used to guide the decisions. In FIG. 1a, the (half) surface areas of 5a through 5c are, respectively, 47, 105, and 83 square units. In turn, the (half) surface areas of the potential parent AABBs, 9, 7, and 11, are, respectively, 1724, 801, and 997 square units. Finally, the surface area of the grandparent AABB, 3, is 2186. The SAH thus assumes that the chance of a ray hitting AABB 9, given that the ray has intersected 3, i.e., $P_{Hit9given3}$, is 1724/2186=78.8%

For the simplicity of this exposition, when estimating SAH scores, we shall assume that the 'cost' of testing a bounding box for intersections is $C_{Box}$ and that the cost of testing a triangle or triangle pair is $C_{Tri}$. Assuming AABB 3 has been intersected, the SAH score for FIG. 1e can then be summarised as the cost of testing the two children and then the probable costs of testing their contents i.e.:

$$2C_{Box}+P_{Hit9given3}(2C_{Box}+(P_{Hit5agiven9}+P_{Hit5bgiven9})C_{Tri})+P_{Hit5cgiven3}C_{Tri}$$

which can also be expressed, by combining probabilities (i.e., ratios of surface areas), as $$2C_{Box}+2C_{Box}+P_{Hit9given3}+C_{Tri}(P_{Hit5agiven3}+P_{Hit5bgiven3}+P_{Hit5cgiven3})$$

To produce a more concrete result, the example will further assume $C_{Box}$=1.0 and $C_{Tri}$=5.0. Using these values, the scores for the arrangement of FIGS. 1e through 1g are then, respectively, 4.11, 3.27, and 3.44. The SAH thus suggests that FIG. 1f is the most cost efficient.

When the direction or range of directions is known however, the acceleration structure can be better optimised to minimise the number of intersections from those particular directions. This results in less work required to traverse the acceleration structure and testing geometry, saving power and reducing the time spent rendering. For illustrative purposes, consider cases where the ray directions are constrained to be parallel to a principal axis and consider the model as viewed by FIGS. 1h, 1i, and 1j, which show orthographic projections along the X, Y and Z axes respectively. From the point of views of such rays, it should be clear that for particular directions, portions of the surface areas of the AABBs 9, 7, and 11 cannot be intersected at all. An SAH that does not take account of differing ray directions is thus inappropriate. In particular, considering only rays parallel to the Z axis and therefore just the surface areas perpendicular to the Z axis, the adjusted relative scores for FIGS. 1e through 1g are 3.69, 3.36, and 3.03, and thus, for such a set of constrained rays, the configuration of 1g would likely be more efficient than 1f as recommended by the SAH that does not take account of differing ray directions.

The inventors have therefore appreciated that biasing the metric so that it more heavily considers the areas of a region, such as a box, weighted by their orientation to an expected ray direction should guide construction of the acceleration structure such that it chooses options that reduce the probability that rays with that particular direction will intersect the constructed regions. This helps to minimise the total number of intersections required to traverse the acceleration structure, for example a structure in the form of a tree.

The present method may therefore evaluate different sets of one or more bounding regions and, for a particular direction or a range of directions, select the set of bounding regions based on the evaluation to form direction-optimised nodes. This selection may be, for example, selecting the set of bounding regions that presents the minimum surface area in the 3D scene portion for a future ray entering the 3D scene along that particular direction. Other factors may be included in the selection, as described elsewhere herein, including, but not limited to, the expected costs of ray tracing that volume's children (given that the parent volume was hit). When the hierarchical acceleration structure is then used by the ray tracing system, a ray that enters that portion of the 3D scene with a direction comparable to the above-mentioned hypothetical direction can then use these direction-optimised nodes. Because the nodes have bounding regions presenting a directionally-minimised surface area, there is a higher probability that the ray will not be put through intersection testing if it is going to miss the primitives. This minimises the computational processing burden of the system and helps prevent unnecessary intersection testing. The above process of creating direction-optimised nodes for the acceleration structure may be repeated for different directions, including any of the cartesian axes X, Y and Z aligned to the 3D scene and a neutral diagonal axis. The method may not be limited to the three cartesian axes X, Y and Z, but may use a quantised to N sets of directions, for example, such as N=3, 4, or 6 principal directions. When different rays, at different angles, enter and propagate in the portion of the 3D scene, the ray tracing system can match the incoming ray angle to the appropriate direction-optimised node.

In a first aspect there is presented a computer-implemented method of generating a hierarchical acceleration structure in a ray tracing system for use in rendering an image of a 3D scene, the method comprising: determining a first region and a further region within the 3D scene: the first region comprising one or more primitives in the 3D scene; the further region comprising one or more primitives in the 3D scene; wherein the further region overlaps the first region and bounds a different volume of the 3D scene than the first region; generating the hierarchical acceleration structure by: selecting the first or further region, by comparing: first data associated with the first region, with further data associated with the further region; the first and further data being associated with a common direction about the 3D scene; using the selected first or further region in the hierarchical acceleration structure; wherein the hierarchical acceleration structure is used for rendering the image of the 3D scene. The first aspect may be adapted according to any teaching provided herein, including but not limited to any one or more of the following.

The computer-implemented method may be configured such that the first and further regions both comprise a common primitive of the 3D scene. Each of the first and further regions may bound the common primitive. In other words, optionally, at least one of the primitives in the scene may be completely contained within the first region, and, also, completely contained within the second region.

As detailed elsewhere herein, the common direction associated with the first group of regions may be a first common direction. The selected first or further region for the first group may be associated with a first branch of the acceleration structure. In some examples a second group of regions, associated with a different common direction, is determined, as detailed elsewhere herein. The selected region for the second group may be for the same node level as the selected region for the first group. For the second group of regions, a region may be selected from a plurality of regions of the second group. The selected region for the second group may be associated with a second branch of the acceleration structure. The first branch and the second branch may be alternative branches for a ray traversal method to follow. The first and second branches may lead to at least one common leaf node, preferably a plurality of common leaf nodes. Preferably all the leaf nodes associated with the first branch are all the leaf node associated with the second branch. The alternative branches may be different branches for bounding at least one primitive at, at least one, same node level. Optionally, the one or more regions selected for the first group (and first common direction) bound the same set of primitives at the same node level as the one or more regions selected for the second group (and second common direction).

The computer-implemented method may comprise a first set of regions and a second set of regions; the first set of regions comprising: the first region; and, a second region comprising one or more primitives in the 3D scene; the second set of regions comprising: a third region, the third region being the further region as previously described; and, a fourth region comprising one or more primitives in the 3D scene; wherein generating the hierarchical acceleration structure comprises: selecting the first set of regions or the second set of regions, by comparing: data associated with the first set of regions, with data associated with the second set of regions; the data associated with the first and second set of regions being associated with the common direction; using the selected first set of regions or the second set of regions in the hierarchical acceleration structure. In examples where there are a first set of regions and a second set of regions, the first set of regions may, in aggregate, bound the same primitives as the second set of regions, in aggregate. In other words, optionally, all of the primitives in the scene that are completely contained within the first set of regions may also be completely contained within the second set of regions.

The computer-implemented method may be configured such that the first set of regions bound the same primitives as the second set of regions.

The computer-implemented method may be configured such that the regions are Axis Aligned Bounding Boxes, AABB's. Other regions may be used such as Oriented Bounding Boxes (OBB's) which are not constrained to be aligned with the axes of the scene.

The computer-implemented method may be configured such that the first and further regions are located within a portion of the image scene; the method comprising partitioning the portion of the image scene into a plurality of sub portions by: determining a first partition of the portion of the image scene; the first partition defining a first sub portion and second sub portion; and, determining a second partition of the portion of the image scene; the second partition defining a third sub portion and a fourth sub portion; wherein each of the first, second, third and fourth sub portions occupy a different volume of the image scene.

The computer-implemented method may be configured such that the portion of the 3D scene is a volume defined by a grid dividing the 3D scene.

The computer-implemented method may be configured such that: a) the first sub portion comprises the first region; b) the second sub portion comprises the second region; c) the third sub portion comprises the third region; d) the fourth sub portion comprises the fourth region.

The computer-implemented method may be configured such that: a) the first sub portion bounds a larger volume of the 3D scene than the first region; and/or, b) the second sub portion bounds a larger volume of the 3D scene than the second region; and/or, c) the third sub portion bounds a larger volume of the 3D scene than the third region; and/or, d) the fourth sub portion bounds a larger volume of the 3D scene than the fourth region.

The computer-implemented method may further comprise determining a third partition of the portion of the image scene; the third partition defining a fifth sub portion and a sixth sub portion; wherein each of the first, second, third, fourth, fifth and sixth sub portions occupy a different volume of the image scene.

The computer-implemented method may be configured such that the portion of the image scene is a box.

The computer-implemented method may be configured such that partitioning the portion comprises dividing the portion into two equal sized sub portions along a plane parallel to an axis of the box; the axis being along an edge of the box that adjoins two box faces.

The computer-implemented method may be configured such that the first partition is orthogonal to the second partition.

The computer implemented method may be configured such that the common direction is selected based on an expected predominant ray direction or ray directions to be tested in the 3D scene.

The computer-implemented method may be configured such that: a) each of the first region and further regions are a shape comprising a plurality of faces; b) each of the first and further data respectively associated with the first and further regions comprise a value associated with at least one of the faces of the respective regions.

The computer implemented method may be configured such that: each of the first and further data respectively associated with the first and further regions comprises a data value associated with at least two of the faces of the respective regions.

The computer implemented method may be configured such that each of the first and further data respectively associated with the first and further regions comprises a data value associated with: a primary face of the respective region; and, each face adjoining the primary face.

The computer implemented method may be configured such that: a) the common direction corresponds to an incident angle of one or more hypothetical rays entering a portion of the 3D scene containing the first and further regions; b) each of the faces associated with the data values at least partially faces the one or more hypothetical rays.

The computer implemented method may be configured such that: a) the common direction comprises a range of different directions, each direction corresponding to an incident angle of a different hypothetical ray entering a portion of the 3D scene containing the first and further regions; b) each of the faces associated with the data values at least partially faces at least one of the hypothetical rays.

The computer implemented method may be configured such that the range of different directions comprises a cone of directions or a pyramid of directions.

The computer implemented method may be configured such that the said data values comprise area values of the faces.

The computer implemented method may comprise determining the first data value by applying a weighting factor to the area of at least two of the faces wherein the area of at least one face is weighted differently to that of another face.

The computer implemented method may be configured such that: selecting the first or further region comprises selecting the region comprising the smallest value.

The computer-implemented method may be configured such that the first and further data respectively comprise a surface area heuristic, SAH.

The computer implemented method may be configured such that: the common direction is a first common direction; a first group of regions comprises the said first and further regions; a second group of regions comprises a first region and a further region; the first and further regions of the second group being the same or different to the first a further regions of the first group; the method comprises, for the second group of regions, selecting the first or further region of the second group, by comparing: first data associated with the first region, with further data associated with the further region; the first and further data being associated with a second common direction different to the first common direction; using the selected first or further region of the second group in the hierarchical acceleration structure. The computer implemented method may further store, in a memory, any one or more of: i) the selected first or further region for the first group of regions; ii) the selected first or further region for the second group of regions. The stored selections may be retrievable from the memory upon executing the traversal of a ray (or one or more rays) in the 3D scene. The said retrieval may retrieve: A) the selected first or further region for the first group or; B) the selected first or further region for the second group; by comparing the ray direction of the ray traversing the scene to the first and second common directions. The said comparison for retrieval may: I) compare: a) the similarity in direction between the direction of the ray being traversed and the first common direction; b) the similarity in direction between the direction of the ray being traversed and the second common direction; II) retrieve the selected region from the first group or second group based upon the closest said similarity derived from step I). The method may equivalently, in a similar process as described above for the first and second groups of regions, select a first or further region for each of one or more further groups of regions; and optionally store the selection/s in the memory. The further groups of regions may each be associated with a common direction that is different to the other common directions. The acceleration structure comprising the selected regions for the first and second group may be generated and stored in memory prior to any ray traversal through the 3D scene.

The computer-implemented method may be configured such that the hierarchical acceleration structure comprises a tree structure comprising: a first node on a first branch associated with the first common direction, a second node on a second branch associated with the second common direction; the first and second nodes being at the same node level in the hierarchical acceleration structure; the method comprising: using the selected first or further region of the first group of regions for the first node; using the selected first or further region of the second group of regions for the second node.

The computer-implemented method may be configured such that the tree structure comprises leaf nodes, wherein each leaf node: a) bounds one or more primitives; and b) is linked to both: the first node on the first branch; and the second node on the second branch.

The computer-implemented method may be configured such that the first common direction is orthogonal to the second common direction.

The computer-implemented method may be configured such that: a) the first common direction is part of a first range of directions; b) the second common direction is part of a second range of directions; c) the first range of directions is different to the second range of directions.

The computer-implemented method may be configured such that the centre direction of the first range is orthogonal to the centre direction of the second range.

The computer-implemented method may be configured such that all of the directions of the first range are different to any of the directions in the second range.

In a second aspect there is presented a computer-implemented method for traversing a ray in a ray tracing system for rendering an image of a 3D scene; the ray tracing system using a hierarchical acceleration structure comprising: a first node at a first node level, the first node associated with a first portion of the 3D scene; the first portion of the 3D scene comprising a first set of one or more regions including a first region comprising one or more primitives in the 3D scene; a second node at the first node level, the second node associated a further portion (which may be the same as the first portion) of the 3D scene; the further portion of the 3D scene comprising a second set of one or more regions including a further region comprising one or more primitives in the 3D scene; the further region overlapping the first region and bounding a different volume of the 3D scene than the first region; the method comprising: I) selecting a ray for traversing through the 3D scene; the ray comprising a ray direction with respect to the 3D scene; II) selecting the first node or the second node based on comparing the ray direction with: a) direction data associated with the first node; and, b) direction data associated with the second node; III) traversing the ray through the portion of the 3D scene associated with the selected first or second node; and, IV) determining whether the ray intersects the set of one or more regions associated with the selected first or second node. The second aspect may be adapted according to any teaching provided herein, including but not limited to any one or more of the following. The computer-implemented method may be configured such that the first and further regions comprise a common primitive of the 3D scene. The computer-implemented method may be configured such that each of the first and further regions bound the common primitive. The computer-implemented method may be configured such that: the direction data associated with the first node comprises a first direction; the direction data associated with the second node comprises a second direction; the first direction is orthogonal to the second direction. Where there are multiple regions for a given portion of the 3D scene, there may be a node for each region, for example, for two regions in the first portion of the 3D scene, there may correspondingly be two first nodes, i.e., one for each region.

The computer-implemented method may be configured such that: a) the direction data associated with the first node comprises data associated with a first range of directions; b) the direction data associated with the second node comprises data associated with a second range of directions; the first range of directions is different to the second range of directions; c) selecting between first node or the second node comprises determining whether the ray direction is within the first range of directions or the second range of directions. The computer implemented method may be configured such that the first and second range of directions each comprises a cone of directions.

The computer-implemented method may be configured such that: a) a centre or average direction of the first range is orthogonal to a centre or average direction of the second range; and/or b) all of the directions of the first range of directions are different to any of the directions in the second range of directions.

The computer-implemented method may be configured such that the first portion of the 3D scene occupies the same volume of the 3D scene as the further portion of the 3D scene.

The computer-implemented method may be configured such that: the first set of regions comprises: the first region; a second region comprising one or more primitives in the 3D scene; the second set of regions comprises: a third region; the third region comprising the further region; a fourth region comprising one or more primitives in the 3D scene. The computer-implemented method may be configured such that the first set of regions bound the same primitives as the second set of regions.

The computer-implemented method may be configured such that: the further portion of the 3D scene is a first further portion; the hierarchical acceleration structure further comprises: a third node at the first node level, the third node associated with a portion of the 3D scene; the portion of the 3D scene, associated with the third node, comprising a third set of one or more regions including region comprising one or more primitives in the 3D scene; the region of the third set overlapping the first region and second region; the method comprising selecting one of the first node, second node and third node, based on comparing the ray direction with: the direction data associated with the first node; and, the direction data associated with the second node; direction data associated with the third node; wherein the direction data associated with the first node comprises a first direction; the direction data associated with the second node comprises a second direction; the direction data associated with the third node comprises a third direction; the first, second and third directions are orthogonal to each other.

The computer-implemented method may be configured such that: the hierarchical acceleration structure further comprises: a fourth node at the first node level, the fourth node associated with a portion of the 3D scene; the portion of the 3D scene, associated with the fourth node, comprising a fourth set of one or more regions including region comprising one or more primitives in the 3D scene; the region of the fourth set overlapping the first, second and third regions; the method comprising selecting one of the first node, second node, third node and fourth node based on comparing the ray direction with: the direction data associated with the first node; and, the direction data associated with the second node; the direction data associated with the third node; direction data associated with the fourth node; wherein the fourth node is a view-independent node. The fourth node may be a direction-independent node.

The method may comprise selecting the fourth node if the ray direction is outside of any acceptable ranges for the first node, second node and third node. The computer-implemented method may be configured such that the hierarchical acceleration structure comprises a tree structure wherein: the first node is on a first branch associated with a first direction, the second node is on a second branch associated with a second direction. The computer-implemented method may be configured such that the tree structure comprises leaf nodes, wherein each leaf node: a) bounds one or more primitives; and, b) is linked to both: the first node on the first branch; and, the second node on the second branch. The computer-implemented method may be configured such that the first and further regions are Axis Aligned Bounding Boxes, AABB's.

In a third aspect there is presented a graphics processing system configured to perform any one or more of the methods of the methods of the first or second aspects.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4b shows a tree topology hierarchical acceleration structure of FIG. 4a;

FIG. 5c shows a tree topology hierarchical acceleration structure of FIG. 5b;

FIG. 7b shows a tree topology hierarchical acceleration structure of FIG. 7a;

Figure 1A:
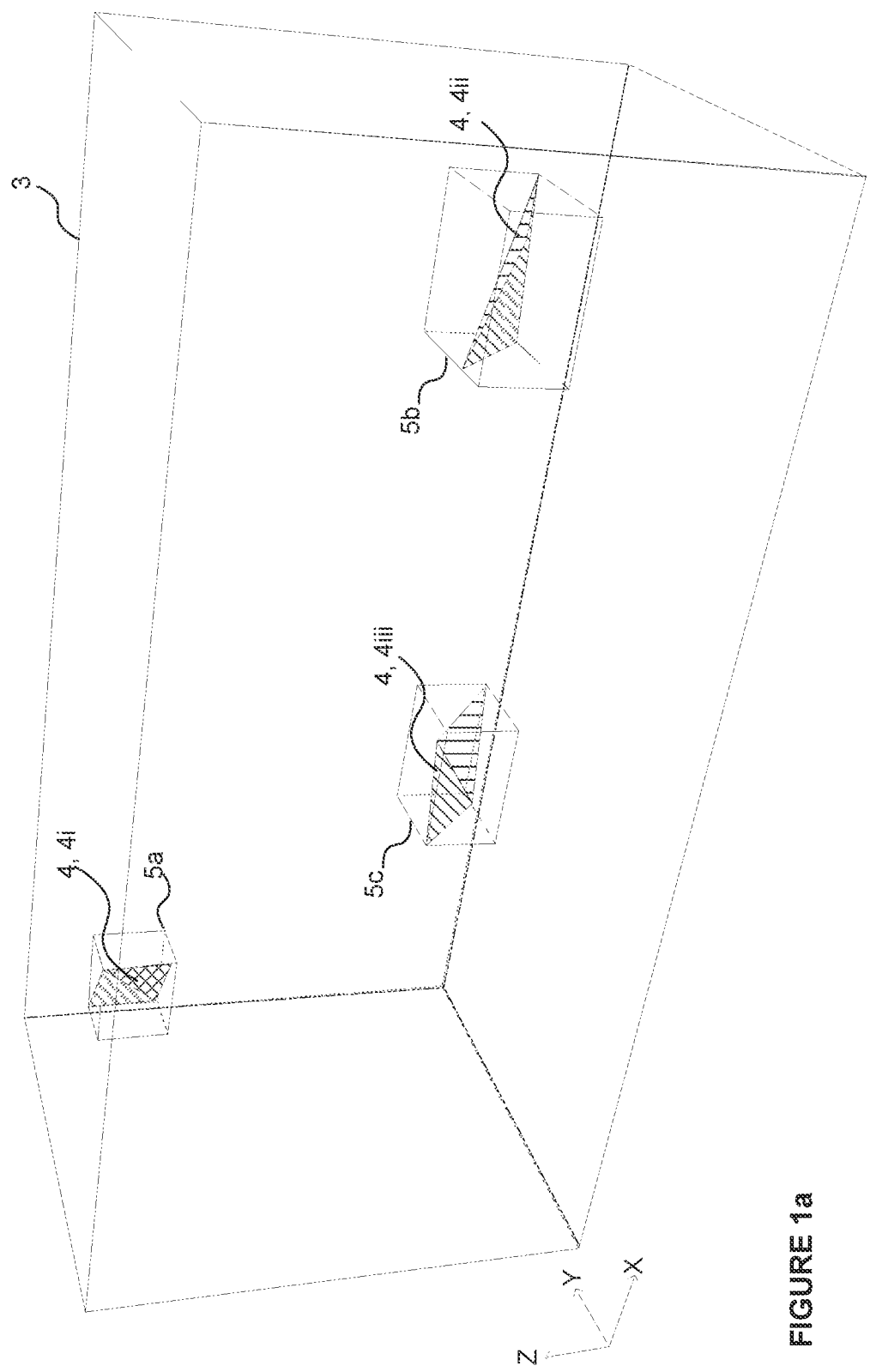
FIG. 1a shows a 3D scene for a ray tracing system with three pairs of triangle primitives.
Figure 1B:
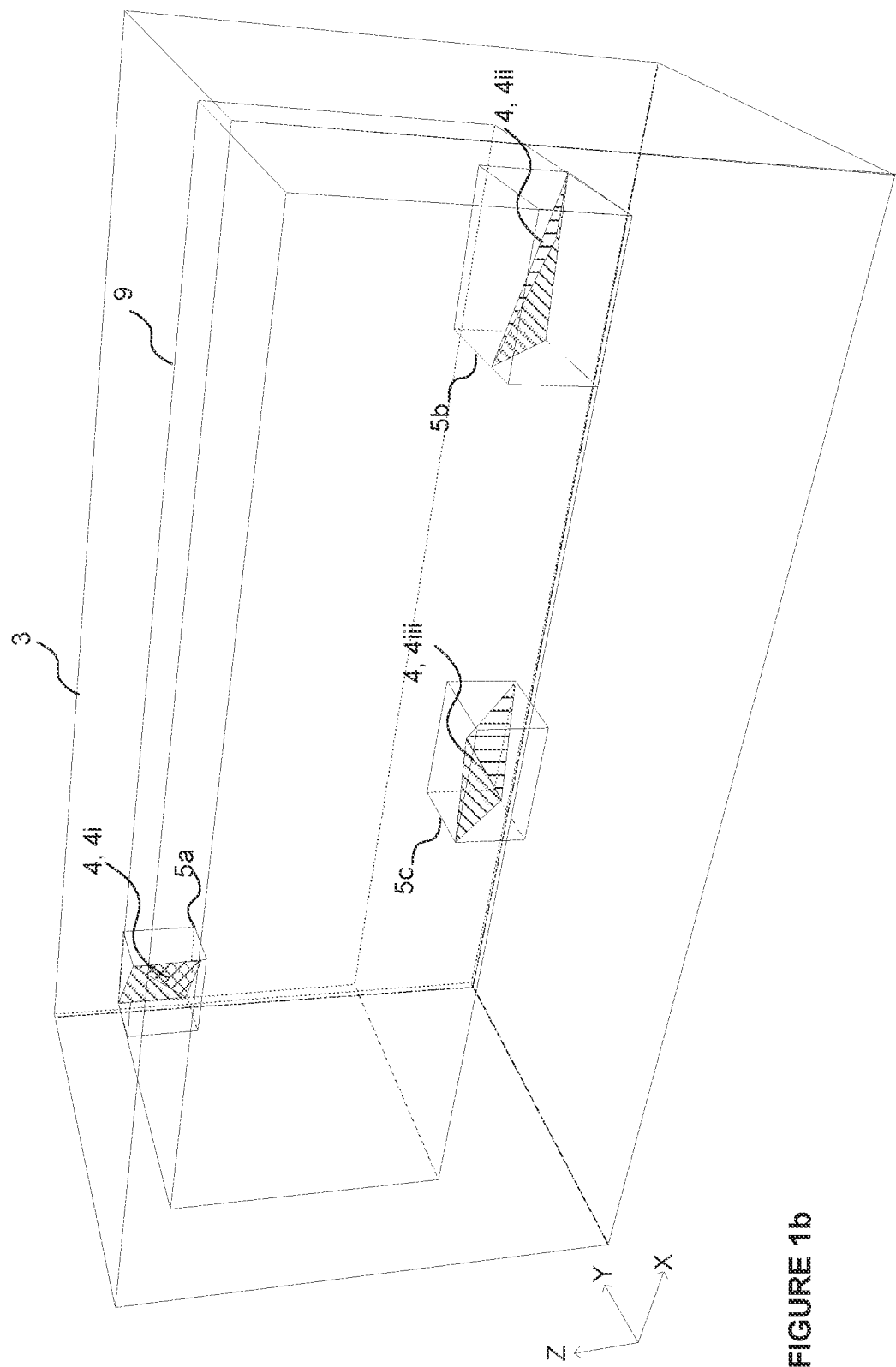
FIGS. 1b-1d show the 3D scene of FIG. 1, each with a different bounding box bounding two of the pairs of triangle primitives.
Figure 1C:
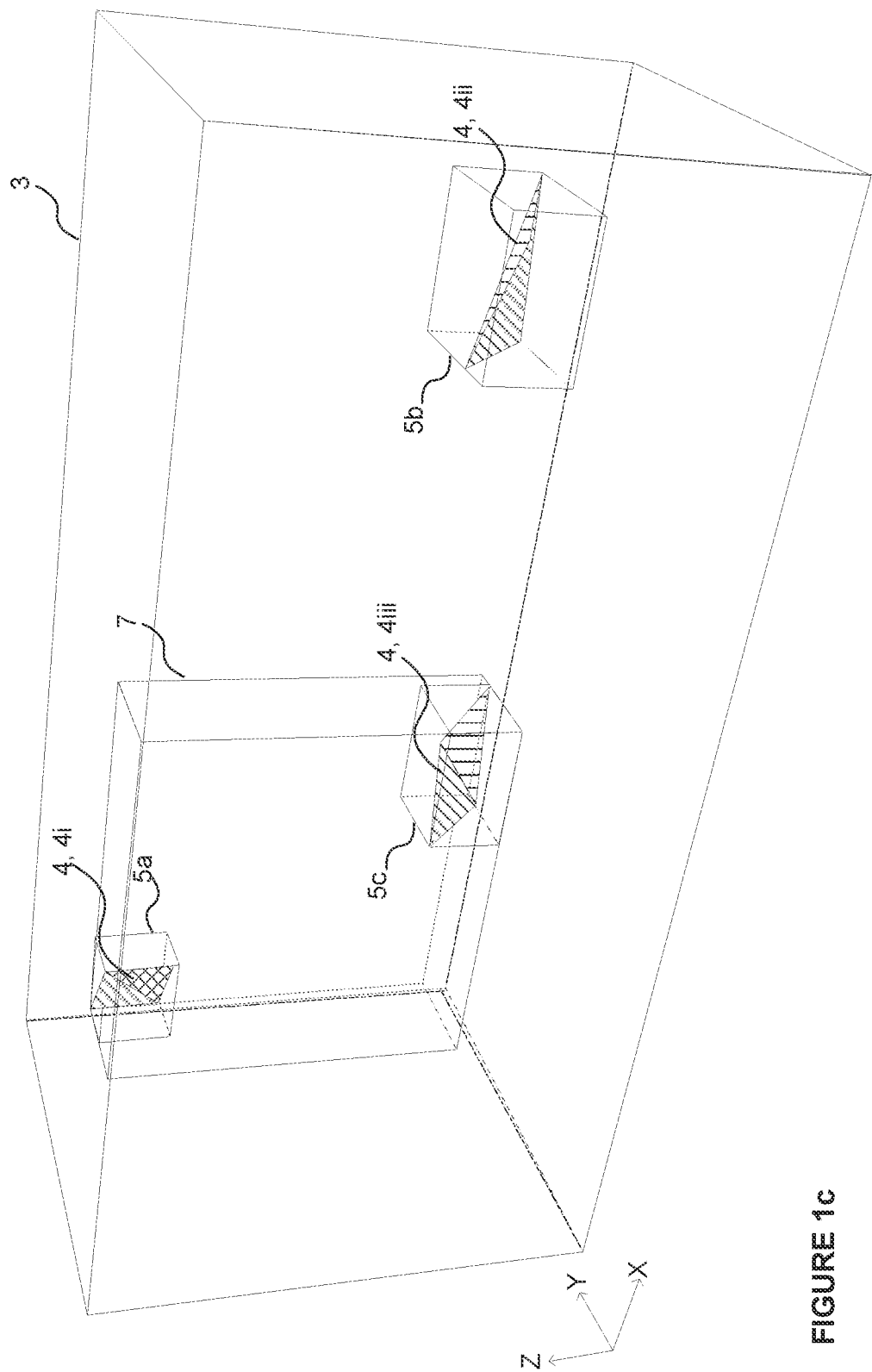
Figure 1D:
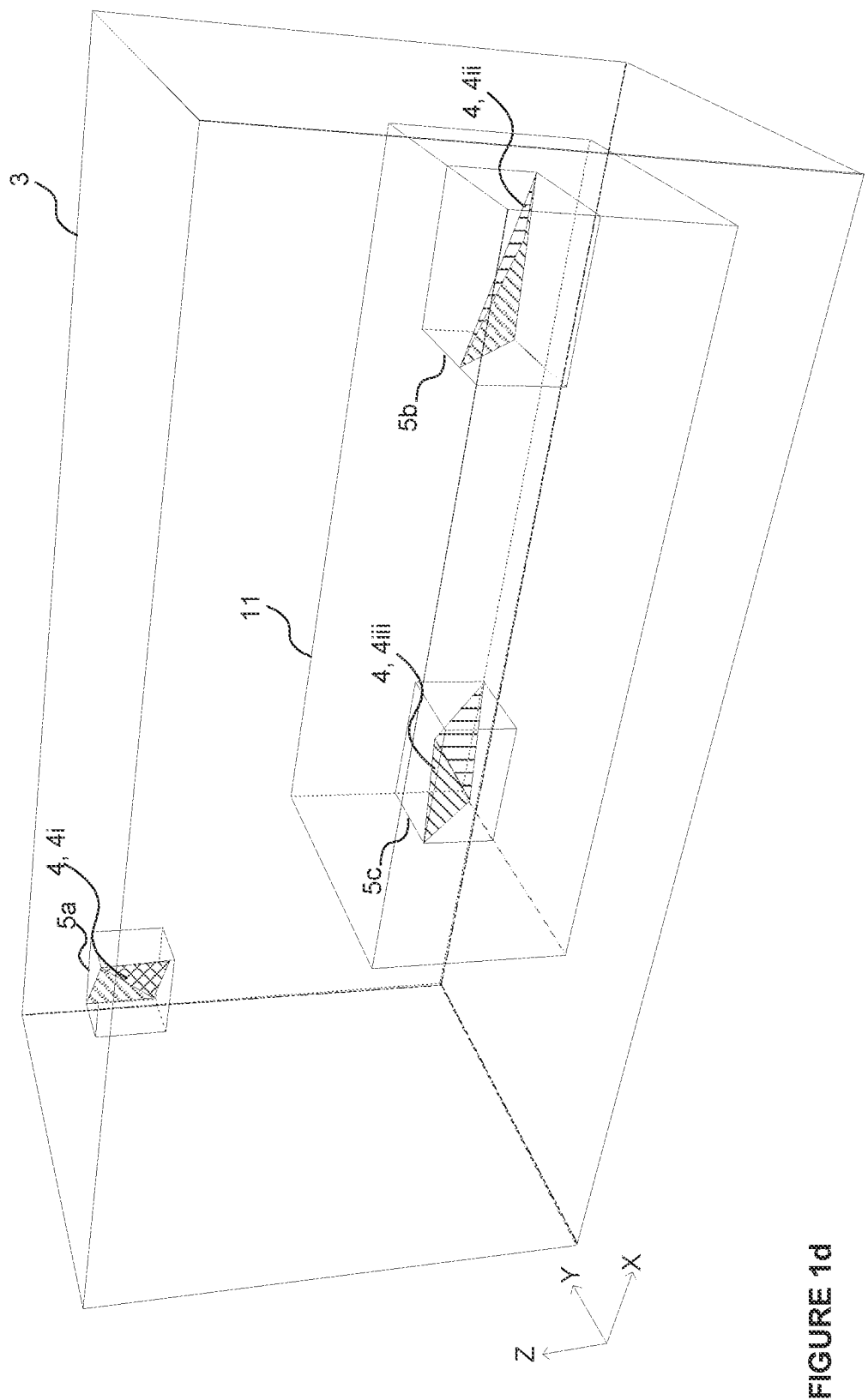

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described byway of example only. Any of the methods described herein may be embodied in a ray tracing system or a graphics processing system.

Figure 2A:
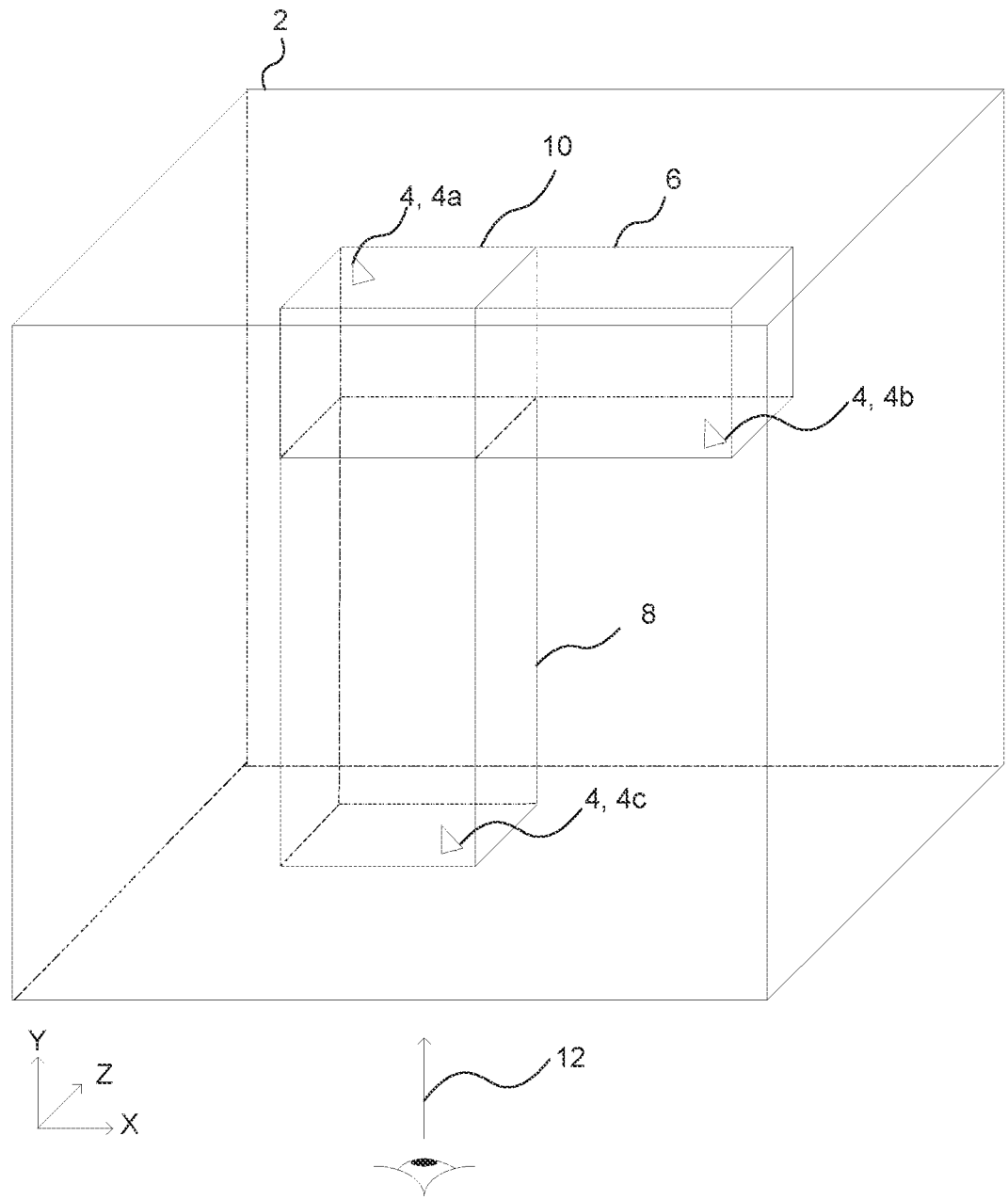
FIG. 2a shows a 3D scene for a ray tracing system with three primitives and two bounding volumes.

There is presented a computer-implemented method of generating a hierarchical acceleration structure in a ray tracing system for use in rendering an image of a 3D scene containing primitives 4. FIG. 2a shows an example of a 3D scene 2 containing three primitives: 4a, 4b, 4c. For simplicity in exposition, this particular example assumes a binary tree is constructed, but extensions to, e.g. N-ary trees etc are possible, such as but not limited to ternary trees. The method comprises determining a first region 6 and a further region 8 within the 3D scene 2. The first region 6 comprises one or more primitives 4 in the 3D scene. In the example of FIG. 2a, first region 6 contains primitives 4a and 4b. The further region 8 also comprises one or more primitives 4 in the 3D scene. In the example of FIG. 2a, the further region 8 contains primitives 4a and 4c. The primitives 4 in FIG. 2a are shown as identical sized triangles, however other shapes and sizes of primitives 4 may be used. The first region 6 and further region 8 shown in FIG. 2a are boxes, however any shape and size of region may be used.

The further region 8 overlaps the first region 6. In the example of FIG. 2a, this overlapping portion is shown by the reference 10. The first region 6 and further region 8 bound different volumes of the 3D scene 2. In other words, at least one of the first 6 or further 8 region bounds a portion of 3D scene that the other does not. In this example each of the first 6 and further 8 regions bound a portion of the 3D scene that the other does not, however in principle one of the regions 6, 8 could bound all of the other region 6, 8 plus a further portion of the 3D scene 2.

The method generates the hierarchical acceleration structure by selecting the first region 6 or further region 8. This selection is done by comparing first data associated with the first region 6 with further data associated with the further region 8. The first and further data are both associated with a direction associated with the 3D scene, for example a viewing direction. The direction may be a common direction and may be a hypothetical or expected ray having a hypothetical or expected ray direction. This direction may be a single direction or a set of directions. The first and further data may be associated with the shape and/or size of the respective region, for example data may be associated with a heuristic, for example, a surface area heuristic calculated from one or more surface area values. In general, the data may be based on a heuristic related to the shape and/or size of the respective region, such as a value calculated using a surface area heuristic, as described elsewhere below.

Figure 2B:
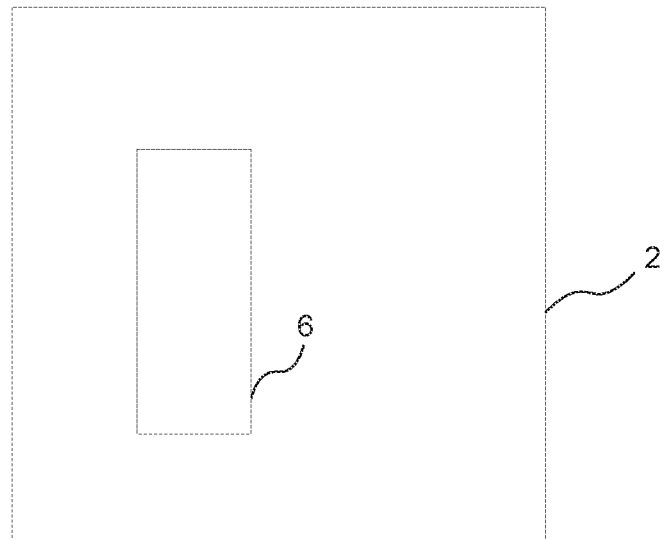
FIGS. 2b and 2c respectively show the view of each of the bounding regions of FIG. 2a when viewing along the Y axis.
Figure 2C:
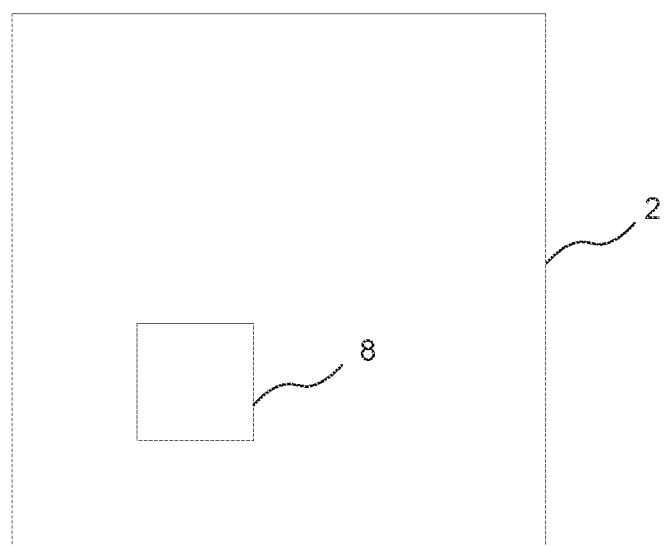

Once the first region 6 or further region 8 has been selected, it is then used to generate the hierarchical acceleration structure used for rendering the image of the 3D scene 2. The selected region 6, 8 may then be used as a node in an acceleration structure, as detailed in further examples elsewhere herein. The method therefore allows for the generation of a hierarchical acceleration structure that takes into account a particular direction about the 3D scene 2. This provides an advantage when the hierarchical acceleration structure is used in ray tracing. Because the hierarchical acceleration structure was developed according to a particular direction, rays having the same or a similar direction are tested against regions optimised for that direction. The selection of the first region 6 or further region 8 may be based on different criteria for example minimising an area of the respective region based on the direction. To illustrate this, take for example the direction 12 shown in FIG. 2*a*, which is a viewing direction directly along the Y axis. If, for example, the method of creating the first region 6 and second region 8 specified that each region could only bound a maximum of two primitives in the region, then the first region 6 and second region 8 may look like those regions 6 and 8 as shown in FIG. 2*a*, each bounding two primitives 4 with a common primitive 4*a* between them. The view of each of those regions looking along the Y direction 12 is shown in FIGS. 2*b* for the first region 6 and FIG. 2*c* for the second region 8. The area seen of the first region 6 in FIG. 2*b* is larger than that of the second region 8 in FIG. 2*c*. If the method required that the region selected for the hierarchical acceleration structure required the viewable area to have the minimum area along the viewable direction 12, then the second region 8 would be chosen for use in the hierarchical acceleration structure because it has a smaller viewable area than the first region 6.

The method discussed above provides for a way of generating a hierarchical acceleration structure. The same method or a different method may also provide a computer-implemented method for traversing a ray in a ray tracing system for rendering an image of a 3D scene wherein the ray tracing system uses such a hierarchical acceleration structure generated using the abovementioned method. For this further method, the hierarchical acceleration structure may comprise a first node at a first node level and a second node at the same first node level. The first node may be associated with a first portion of the 3D scene. The first portion of the 3D scene comprises a first set of one or more regions including a first region comprising one or more primitives in the 3D scene. The second node may be associated with a further portion of the 3D scene. The further portion of the 3D scene comprises a second set of one or more regions including a further region comprising one or more primitives in the 3D scene. The further region may overlap the first region and bound a different volume of the 3D scene than the first region. The method may select a ray for traversing through the 3D scene. The ray comprises a ray direction with respect to the 3D scene. The method may then select the first node or the second node based on comparing the ray direction with: a) direction data associated with the first node; and, b) direction data associated with the second node. After the node has been selected, the method may then traverse the ray through the portion of the 3D scene associated with the selected first or second nodes. As part of the ray tracing process, the method may then determine whether the ray intersects the set of one or more regions associated with the selected first or second node. It is noted that further intersection tests may also need to be performed for other regions containing primitives, or primitives, outside of the selected box. For example, if region 6 was selected in FIG. 2*a*, primitive 4*c* would be intersection tested as well.

Figure 3A:
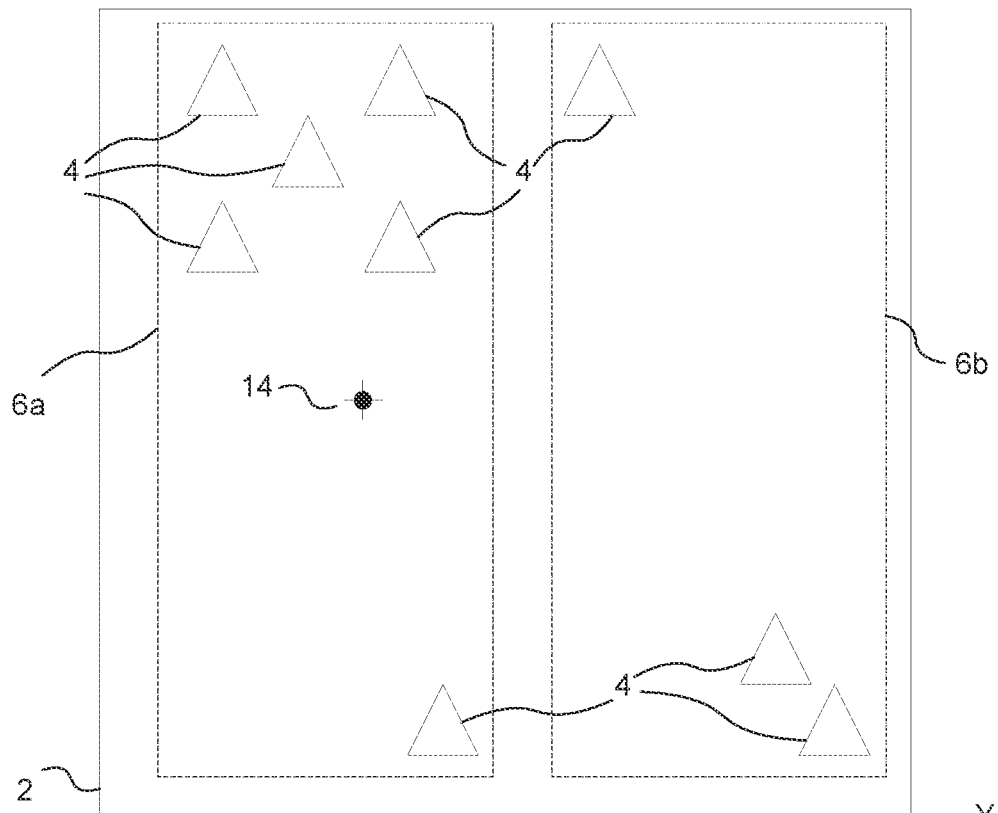
FIGS. 3a and 3b show a 2D view of a 3D scene wherein two sets of bounding regions alternatively bound the primitives in the 3D scene.
Figure 3B:
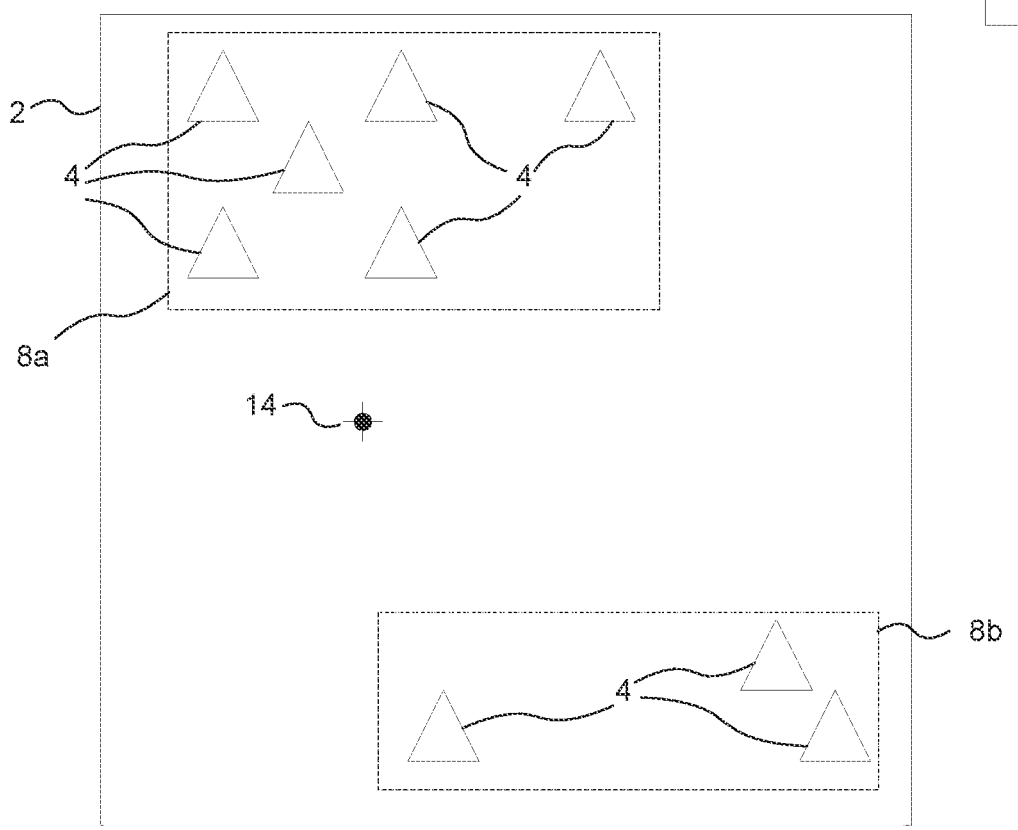

The method for generating an acceleration structure and the method for traversing a ray in a ray tracing system are explored further underneath starting with a further example shown in FIGS. 3*a* and 3*b*. In FIGS. 3*a* and 3*b* only single pairs of regions are shown that correspond to the same node level in the acceleration structure. Further subdivisions of the scene 2 into further node levels, as shown in other examples herein, turn the acceleration structure into a hierarchical acceleration structure.

FIGS. 3*a* and 3*b* show an example where the 3D scene 2 has nine primitives 4. The views of the 3D scene in FIGS. 3*a* and 3*b* are shown in 2D and are assumed to be viewed along one axis direction of the 3D scene 2, for example the Z direction. Furthermore, the example shown in FIGS. 3*a* and 3*b* depict a 2D view of the full 3D scene 2, however in principle the 3D scene 2 shown in FIGS. 3*a* and 3*b* may only represent a portion of the full 3D scene to which the method is applied. In this example the method requires that all the primitives 4 in the 3D scene are bounded by at least one region and that the method selects between a first set of regions 6*a*, 6*b* and a second set of regions 8*a*, 8*b*. In this example the method requires that each set of regions comprises a maximum of two regions per set. FIG. 3*a* shows the 3D scene 2 with the first set of two regions 6*a*, 6*b* applied. FIG. 3*b* shows the 3D scene 2 with the second set of two regions 8*a*, 8*b* applied to the same 3D scene 2 with the same primitives 4 in the same positions. The first set of regions 6*a*/6*b* are created by using a box to capture primitives on the left-hand side of the 3D scene 2 and a box to capture primitives on the right-hand side of the 3D scene 2. The second set of regions 8*a*/8*b* are created by using a box to capture primitives towards the top of the 3D scene 2 and a box to capture primitives towards the bottom of the 3D scene 2. The combined area, facing the Z direction, of the first set of regions 6*a*/6*b* is larger than the corresponding combined area of the second set of regions 8*a*/8*b*. As with the previous example shown in FIGS. 2*a*, 2*b*, the method in this example selects the regions with the smallest combined area to be used to form the hierarchical acceleration structure. In this example the set of regions with the smallest combined area is the second set of regions 8*a*/8*b*. The selection of the second set of regions 8*a*/8*b* in this example has been associated with a Z direction view of the 3D scene 2, which as described above for FIGS. 3*a* and 3*b* is into the page.

When this acceleration structure is then used in further processing steps in the ray tracing system, the selection of the second set of regions 8*a*/8*b* allows a greater chance for rays along the Z direction to avoid going through intersection testing when they are far away from primitives 4. This is shown in FIGS. 3*a* and 3*b* by the ray 14 which is propagating into the page along the Z direction. This ray 14 is not positioned to hit any of the primitives 4, therefore, to reduce computational burden, the system should ideally not subject this ray to any further intersection testing after intersection tests have been made for the node level associated with the selected regions 8*a*/8*b*. By selecting the second set of regions 8*a*/8*b*, this ray 14 if introduced into the 3D scene 2, would miss the regions 8*a* and 8*b* bounding the primitives. The ray 14 would therefore not be subject to further unnecessary intersection testing which in turn reduces computational burden on the ray tracing system. If, however, the first set of regions 6a, 6b were chosen, then the intersection test of the ray 14 with region 6a would result in a hit. Because of this initial 'hit' with region 6a, the ray would then need to be intersection tested with the children of region 6a, which in this example are the six primitives within region 6a. The further intersection testing of all these primitives in region 6a with ray 14 would result in an eventual finding of a miss because it does not intersect any of the primitives 4. This further set of intersection tests of the children of region 6a would be a waste of computation resource because none of the further tests would result in a hit. The above example of ray 14 hitting a region of the pair 6a/6b but not the pair 8a/8b is true for the single ray 14, however, in practice, other rays would be incident into the scene in other positions, for example in other positions along the Z direction. For any arbitrary ray position into the scene 2 along the Z direction, the regions 8a/8b present a reduced surface area for intersection testing than regions 6a/6b. Therefore, selecting the second set of regions 8a and 8b for an acceleration structure for the Z direction gives rays along the Z direction, that are not going to hit a primitive, a better chance of not being subject to unnecessary intersection testing.

Figure 4A:
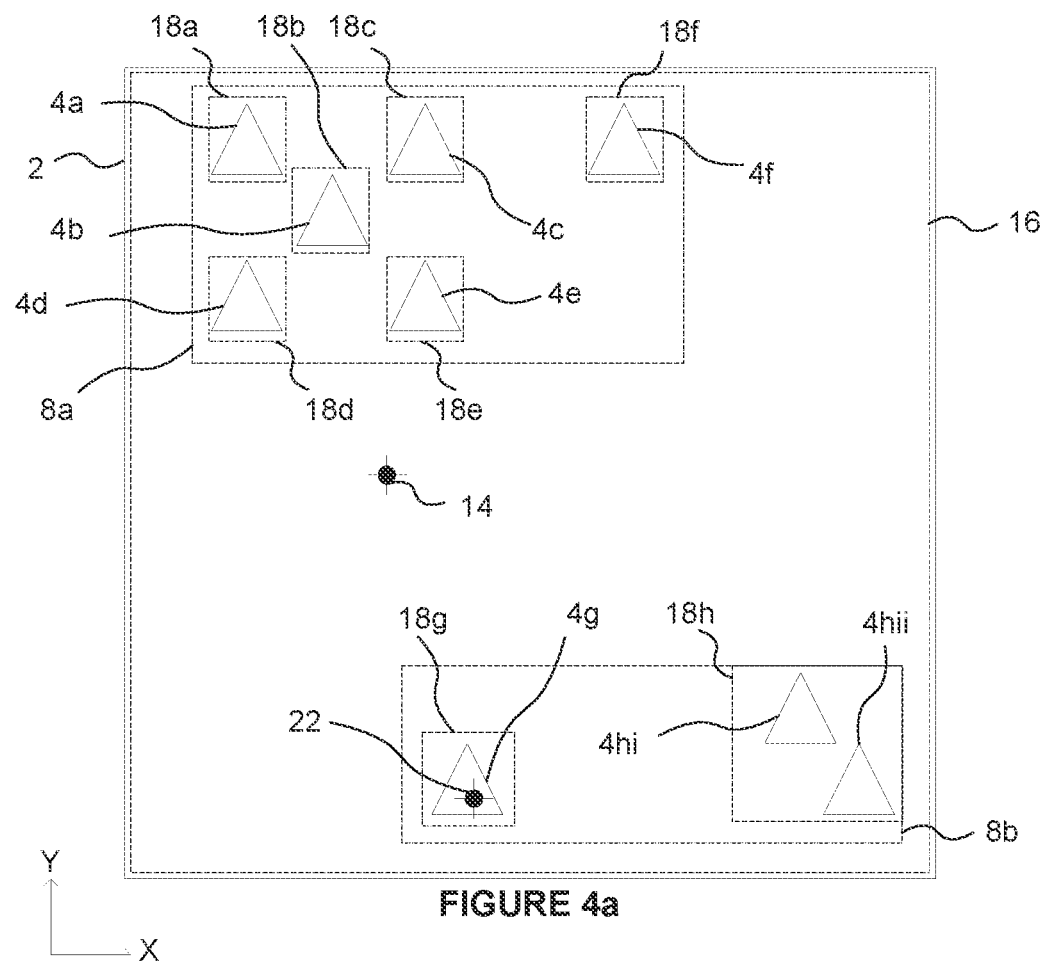
FIG. 4a shows a 2D view of a 3D scene similar to that of FIG. 3b wherein the bounding regions are shown bounding further child bounding regions.
Figure 4B:
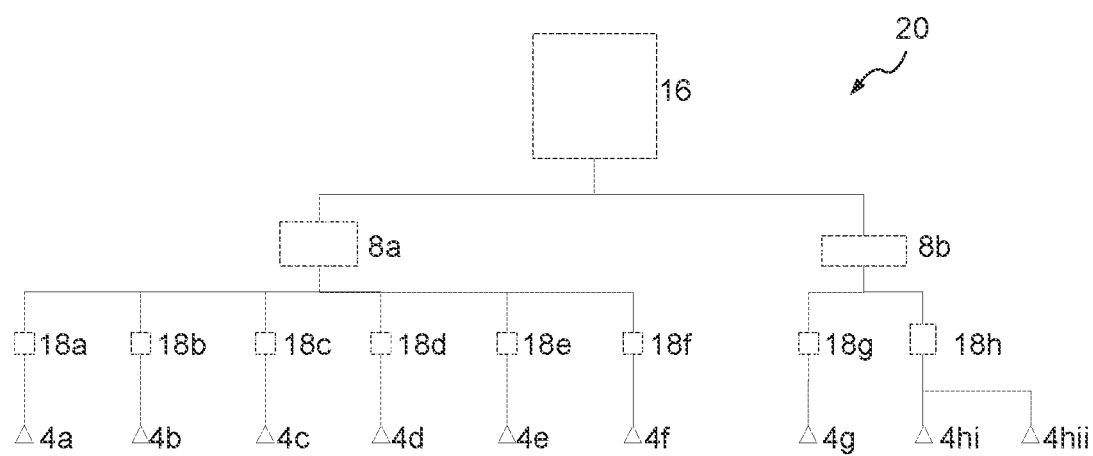

FIG. 4a shows a 3D scene 2 similar to that of FIG. 3b wherein the 3D scene 2 has been assigned three levels of nodes to form the hierarchical acceleration structure. The first node 16 at the first node level encompasses the whole of the 3D scene. This first node contains two child nodes at the next, intermediary, node level. These two child nodes are the regions 8a and 8b selected by the method as previously described. Each of the intermediate nodes 8a, 8b, bound one or more leaf nodes at the next node level. Each leaf node bounds one or more primitives 4. In FIG. 4, the node represented by the region 8a contains leaf nodes 18a-f whilst the node represented by the region 8b contains leaf nodes 18g and 18h. Each leaf node 18a-18g bounds a single corresponding respective primitive 4a-g, where leaf node 18h contains two primitives 4hi and 4hii. FIG. 4b shows the corresponding hierarchical acceleration structure 20 for FIG. 4a showing the parent node represented by region 16, intermediary tree nodes represented by regions 8a and 8b and leaf nodes 18a-h. When a ray, for example ray 14 is processed in the ray tracing system it will be tested against the parent node first, creating a hit as the ray 14 is within the bounding box 16. When then subsequently tested against the child nodes of the parent represented by bounding regions 8a and 8b, the result would be a miss and no further intersection testing of this ray would take place for this particular 3D scene. If, for example, another ray 22 were directed along the Z axis (into the page) at a different X, Y coordinate then a different result would occur. Like ray 14, ray 22 would be tested against bounding box 16 and would result in a hit. When tested against the child node bounding boxes represented by regions 8a and 8b, region 8b would result in a hit. When further tested against the child nodes of region 8b, which are the leaf nodes 18g and 18h, leaf node 18g results in a hit. A shader program may then be run to determine what happens to the intersection of ray 22 with the primitive 4g of the leaf node 18g. The primitive intersection test could be in hardware or software. For example, hardware may be used for testing against triangle primitives but a procedural primitive may be tested using software.

So far, the method has focused on generating a node or nodes of an acceleration structure by selecting between different regions or sets of regions based upon a single direction. In the previous examples this has been the Z direction about the 3D scene 2. A ray tracing system, however, may have rays traversing the 3D scene 2 from many directions including, but not limited to, the X direction and Y direction. The method may create a further set of one or more nodes in the acceleration structure for a different direction or set of directions. That is, a single acceleration structure may comprise nodes associated with different directions, such that particular rays can be tested using the nodes with the most relevant direction. The same methodology of selecting between two regions or two sets of regions to generate the hierarchical acceleration structure may apply equally to generating these further nodes for the further direction, for example, minimising the area facing the further viewing direction. This principle is discussed further below with regard to FIGS. 5a, 5b, 5c and 5d. The method is not limited to selecting between two regions or two sets of regions but may be used to select between one or more regions or one or more sets of regions, for example, selecting between three sets of two regions.

Figure 5A:
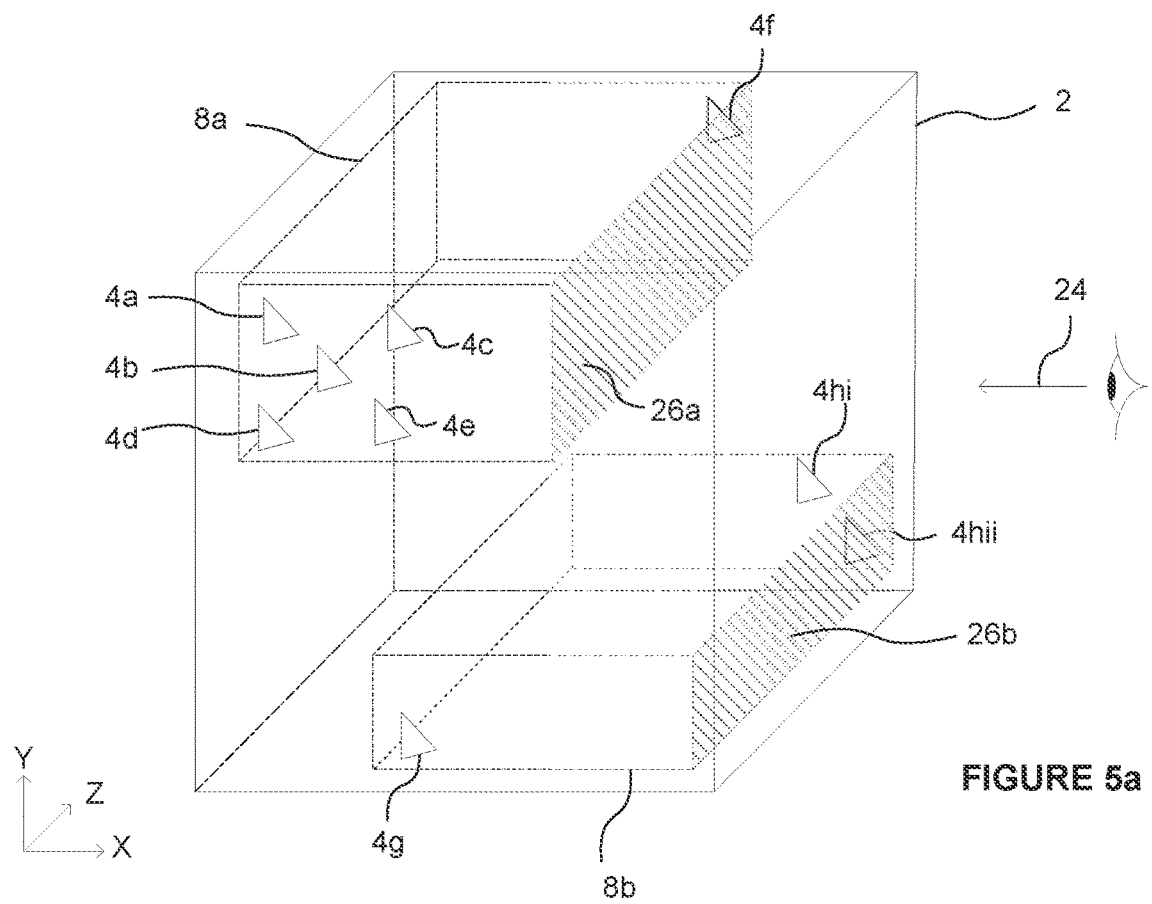
FIGS. 5a and 5b show a 3D scene similar to that of FIGS. 3a-4b with two alternative sets of bounding regions.

FIG. 5a shows a 3D view of the 3D scene of FIG. 4a. The primitives 4a-4hii in FIG. 5a are shown as triangles. The primitives 4a, 4b, 4c, 4d, 4e and 4g are all located towards the 'near' end of the 3D scene 2 when viewed along the Z direction, whilst the primitives 4f, 4hi and 4hii, are all located towards the 'far' end of the 3D scene 2 when viewed along the Z direction. The second set of regions 8a and 8b are both AABB's. Region 8a has near primitives 4a, 4b, 4c, 4d, 4e as well as far primitive 4f. The AABB defining the region 8a therefore has to extend along almost the entire Z direction to bound all of its allocated primitives. Similarly, region 8b has near primitive 4g as well as far primitives 4hi and 4hii. The AABB defining the region 8b therefore also has to extend along almost the entire Z direction to bound all of its allocated primitives. For the viewing direction along the X axis, in the negative X direction 24, the regions 8a and 8b have surface areas 26a and 26b facing the X direction 24.

Figure 5B:
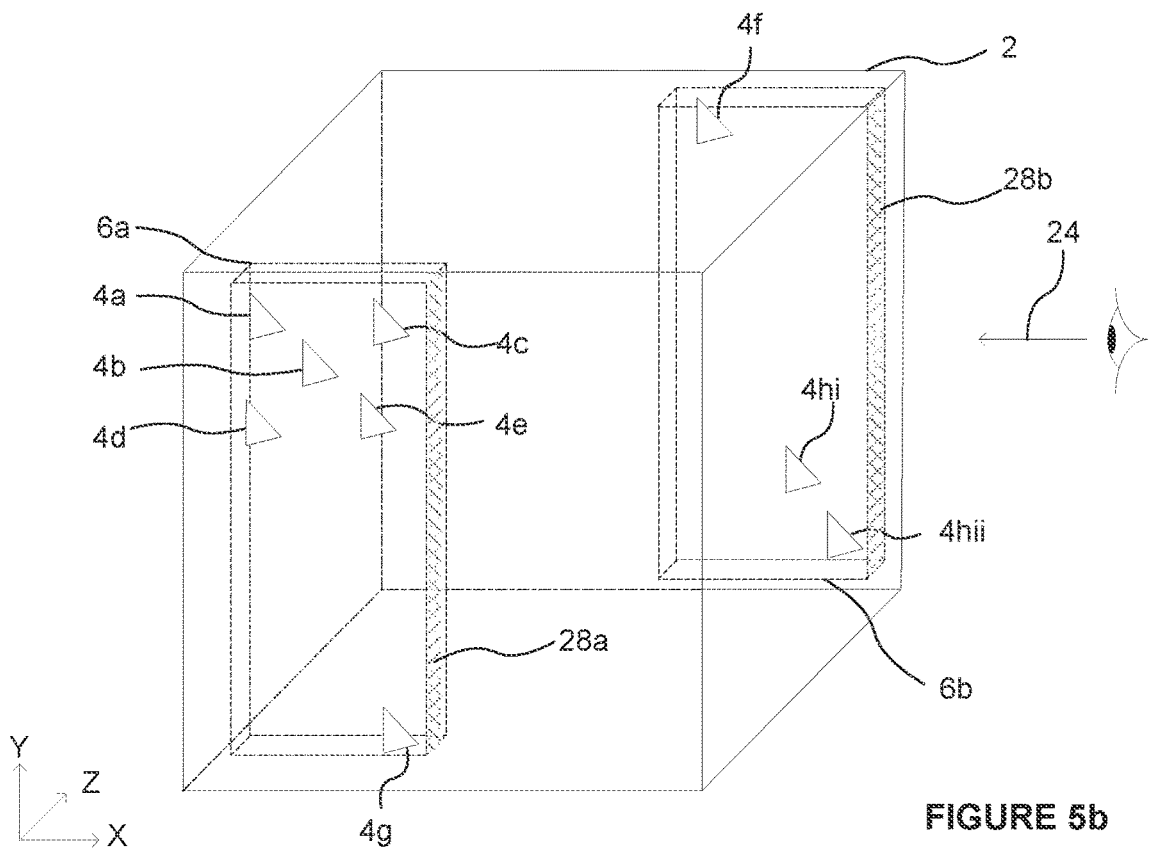

FIG. 5b is similar to that of FIG. 5a with like numerals representing like features. Instead of showing regions 8a and 8b, (i.e., the second set of regions previously described), FIG. 5b, shows the first set of regions 6a and 6b. When considering the Z direction, the method previously chose not to select regions 6a and 6b because they had a larger total surface area facing the Z direction. Region 6a bounds the primitives 4a, 4b, 4c, 4d, 4e and 4g, which are all at the 'near' end in the Z direction. Region 6b bounds the primitives 4f, 4hi and 4hii which are all at the 'far' end in the Z direction. Because the AABBs defining regions 6a and 6b do not significantly extend across the depth of Z, they present narrow thin strips 28a and 28b when viewed along the X direction 24. The combined surface area facing the X direction for regions 6a and 6b is less than the corresponding combined surface area of the regions 8a and 8b. Therefore, despite the method selecting regions 8a/8b as the preferred set of regions for the Z direction, the method would select regions 6a and 6b for the X direction.

Figure 5D:
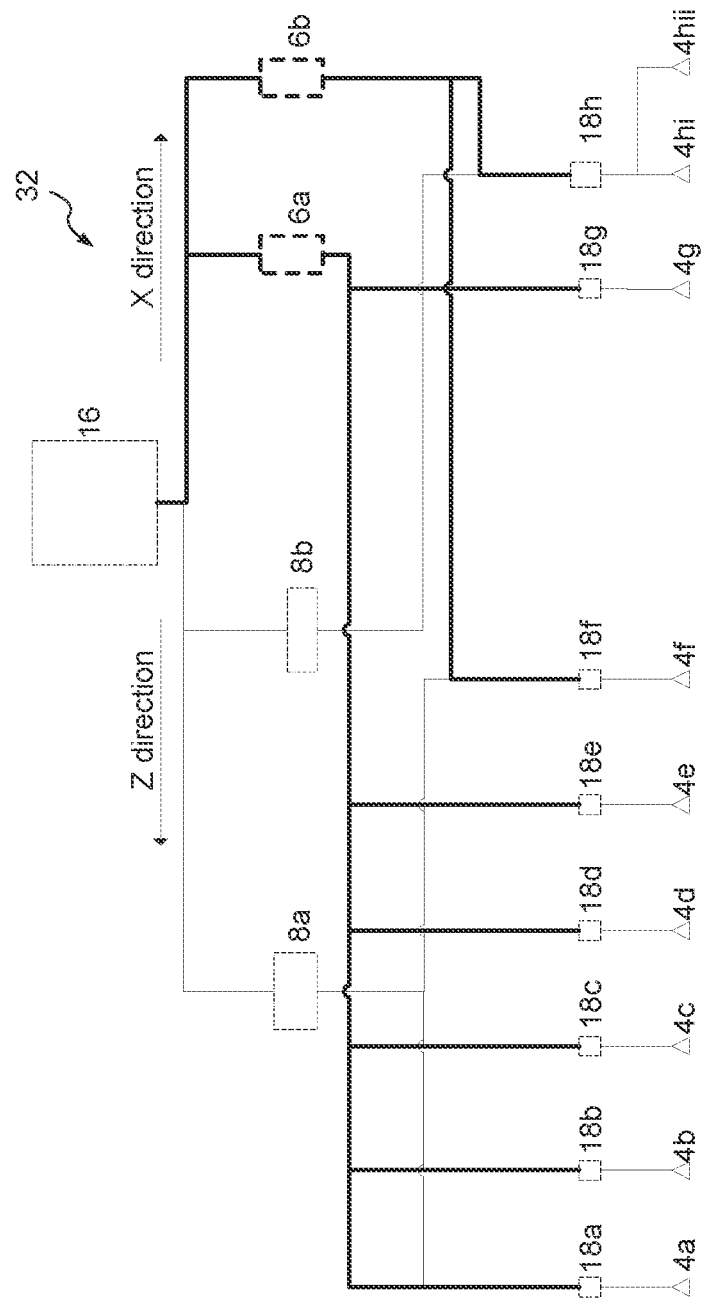
FIG. 5d shows a tree topology hierarchical acceleration structure with nodes created from the bounding volumes of FIGS. 5a and 5b.

FIG. 5c shows a hierarchical acceleration structure 30, similar to that shown in FIG. 4b, with like numerals representing like features, but generated for the X direction using regions 6a and 6b. FIG. 5d shows the combined hierarchical acceleration structure 32 that combines both the hierarchical acceleration structure 20 for the Z direction and the hierarchical acceleration structure 30 for the X direction. The figure thus shows a first group of regions 6a/6b for the X direction and a second group of regions 8a/8b for the Z direction. Each of the regions 6a, 6b, 8a, 8b act as intermediary nodes in the acceleration structure between the parent node 16 and the leaf nodes 18. In FIG. 5*d* the paths between the intermediary tree nodes 6*a* and 6*b* to the leaf nodes 18*a-h* are shown in the thicker lines than the paths between the intermediary tree nodes 8*a* and 8*b* to the leaf nodes 18*a-h*. The method is not limited to having the hierarchical acceleration structure generated for X and Z directions. The generation of the hierarchical acceleration structure may also perform the same selection process for the Y direction and/or other directions with respect to the 3D scene. The method may select the same set of regions for different directions, in which case the corresponding branches in the hierarchical acceleration structure can be reused. For example, if regions 6*a* and 6*b* were selected when optimising for the Y direction, the acceleration structure 32 would not need additional nodes and the same branch can be used by rays primarily in the X direction and rays primarily in the Y direction.

When the hierarchical acceleration structure is generated for the desired range of alternative directions it can then be used to traverse rays through the scene to perform intersection testing. Taking the example in FIGS. 5*a*-5*d* where the hierarchical acceleration structure has been generated to have alternative branches for the X direction and the Z directions, the method may determine the direction of the ray under test that is to traverse the 3D scene 2. If the ray is primarily travelling along the X direction, it will use the branches set out in FIG. 5*c* to traverse the scene whilst if the ray is travelling primarily along the Z axis, it will use the branches set out in FIG. 4*b* to traverse the scene. By doing this the ray tracing system maximises the chance that, a ray that is not going to intersect with a primitive in the 3D scene 2 misses the intermediary nodes, thus preventing unnecessary intersection testing. The method may also accommodate for rays that are not travelling directly along on the X, Z (or Y), for example a ray travelling at 10 degrees off the Z axis, as discussed later.

In the above examples, different hierarchies would generally be constructed for each of the predetermined ray directions. Although each such hierarchy would be tailored for the particular principal direction or range of directions, there is a cost in terms of storage. For example, given a hierarchy which uses, for simplicity of exposition, a binary tree that references N primitives, it would be expected that there would be N−1 tree nodes, i.e. non-leaf nodes, in the tree. Therefore, if a ray tracing system allowed for M specialised direction sets, then one would expect, in the general case, to be up to a total of (N−1)*M tree nodes. Primitive, i.e. leaf, nodes can be shared between the hierarchies. Further, in some fortuitous cases, as shown in examples above, some lower extremities of the various hierarchies might be identical and thus could be shared, but this might not be common.

A more compact representation, which retains most of the performance benefits, is described by way of example. Consider a scene with $2^{j(k-1)+1}$ primitives for which an initial binary tree is constructed using, for example, an SAH that does not take account of different ray directions. This will have a total of $2^{j(k-1)+2}-1$ nodes (hierarchy and leaf nodes) and, if balanced, would have a tree depth of $j^{(k-1)+1}$. In the following description, a top-down approach will be described but a bottom-up would work equally well.

Consider just the subtree comprising the top k levels, k≤3, of the initial constructed tree—this will have $2^k-1$ nodes. Define the topmost node as the "root" of the subtree and consider the $2^k-1-2$ nodes at level "k" as "pseudo primitives". The $2^{k-1}$ "pseudo primitives" are then used to construct local hierarchies for each of the M different direction sets supported by the system using the modified heuristics. Note that all these direction-set local hierarchies will all share the same "root" node and all will reference the same $2^{k-1}$ "pseudo primitive" nodes. Each local hierarchy thus will have at most $(2^k-1-2^{k-1})$ nodes between the "root" and the "pseudo primitive" nodes, i.e., $2^{k-1}-2$ nodes, i.e. a reduced number of unique nodes. The process can then repeat recursively, (or in parallel or actually in any order), by identifying subtrees starting at each of the "pseudo primitive" nodes treating those as new "roots", until the leaves of the original tree are reached. The process may also skip some of the sub-trees, e.g., some of the lowest levels.

The choice of k represents a compromise between data structure size and traversal efficiency. Smaller values of k will result in more shared nodes and thus lower node count/memory footprint, while larger values will result in better directional optimisation. Further, the choice of k may be fixed or varied, e.g., globally or locally.

Figure 11A:
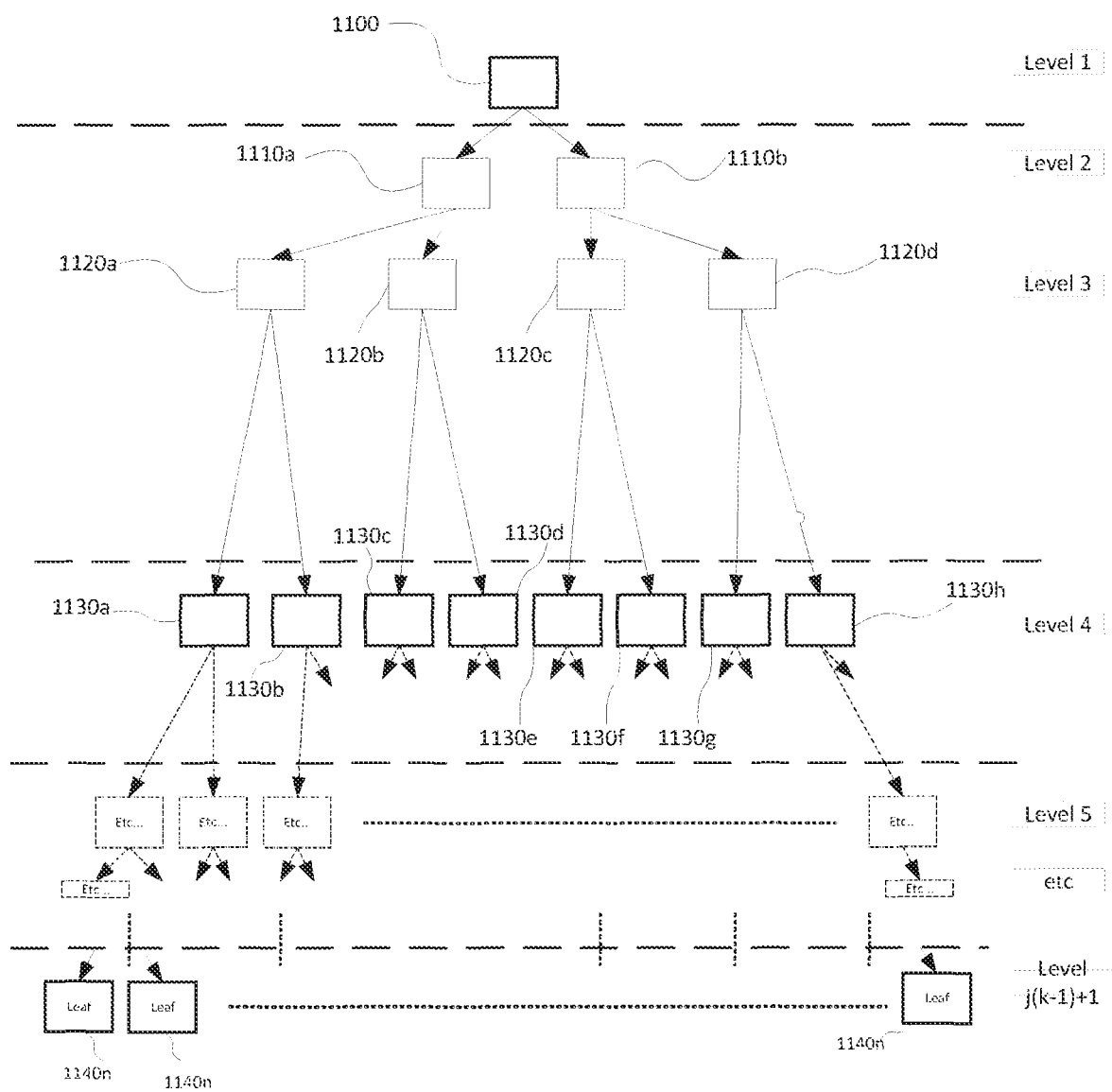
FIG. 11a shows an example of a hierarchy with j*(k−1)+1 levels using a binary tree.
Figure 11B:
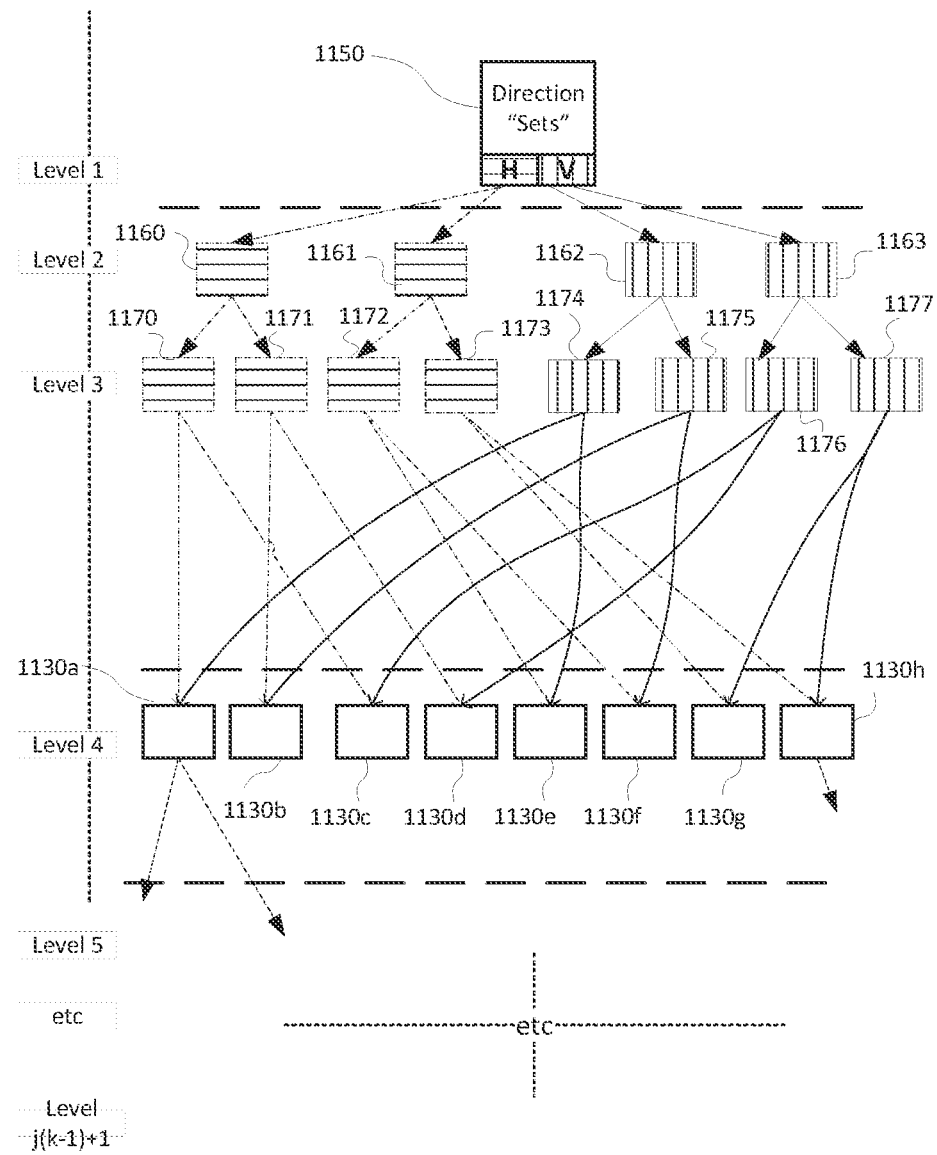
FIG. 11b illustrates a tree enhanced to handle directional rays.

FIGS. 11*a* and 11*b* give a simple but more concrete example of this approach. FIG. 11*a* shows an example of a hierarchy with j*(k−1)+1 levels using a binary tree which has been constructed using some initial approach, e.g. SAH. Further, this simple example has a balanced tree, but in practice the tree, particularly towards the bottom most nodes, will not be balanced, however the principles will still apply. Finally, only the top few layers of the tree are shown in detail to avoid an overly cluttered diagram.

In FIG. 11*a*, k has been chosen to be 4. The root node 1100 on level 1 references two child nodes 1100*a* 1100*b* on level 2 which, in turn, respectively, reference pairs 1120*a* 1120*b*, and 1120*c* 1120*d*, all on level 3. The nodes on level 3, in turn, reference pairs of nodes on level 4 1130*a* through 1130*h*. As k has been chosen as 4, the nodes in level 4 are then treated as "pseudo primitives". Further nodes at other levels, such as level 5 are labelled 'Etc'. Leaf nodes are labelled 1140*n*.

In FIG. 11*b*, which illustrates a tree enhanced to handle directional rays, it has been assumed directions are classified into 2 sets, here nominally "horizontal" (or "H") and "vertical", (or "V"). In practice, the number of direction sets would likely be chosen to be greater than two but it can be appreciated that visualisation, via a 2d diagram, rapidly becomes problematic with increasing numbers of sets. In FIG. 11*b*, the root node, 1150, is an enhanced version of, 1100, in that it has references to a pair of nodes 1160 1161 for the "H" direction set, and another pair 1162 1163 for the "V" direction set. Node 1160 in turn references a pair of directional nodes, 1170 and 1171, which in turn references a pair each of the original "pseudo primitives" at level 4. In practice the nodes of level 4 in FIG. 11*b* may in turn be 'enhanced' much in the way the root node 1100 was extended to 1150. In this example, node 1170 references 1130*a* and 1130*c* in level 4, while node 1171 references 1130*b* and 1130*d*. Note that the level 3 nodes 1170 and 1171 may or may not reference different pairs of nodes in level 4 to any of the level 3 nodes in FIG. 11*a*.

In a similar fashion to node 1160, node 1161 references a pair of nodes 1172 and 1173, which each reference their own pairs of nodes in level 4, node 1162 references nodes 1174 and 1175 which also reference a total of 4 nodes in level 4, and node 1163 references nodes 1176 and 1177, which also reference a total of 4 nodes in level 4.

In FIG. 11*b*, in this example it can be seen that nodes 1173 and 1177 of level 3, which, although optimised for, respectively, the "H" and "V" direction sets, by coincidence reference the same pairs of nodes in level 4, i.e., 1130*g* and 1130*h*. In a different example, nodes 1173 and 1177 could thus be 'replaced' with a single node, which might be referred to as "1130*gh*", with parent nodes, 1161 and 1163 both instead referencing 1130*gh*. Merging identical nodes may allow a more compact representation of the hierarchy, which can have benefits for reducing memory usage, cache replacement, and/or bandwidth.

Figure 6:
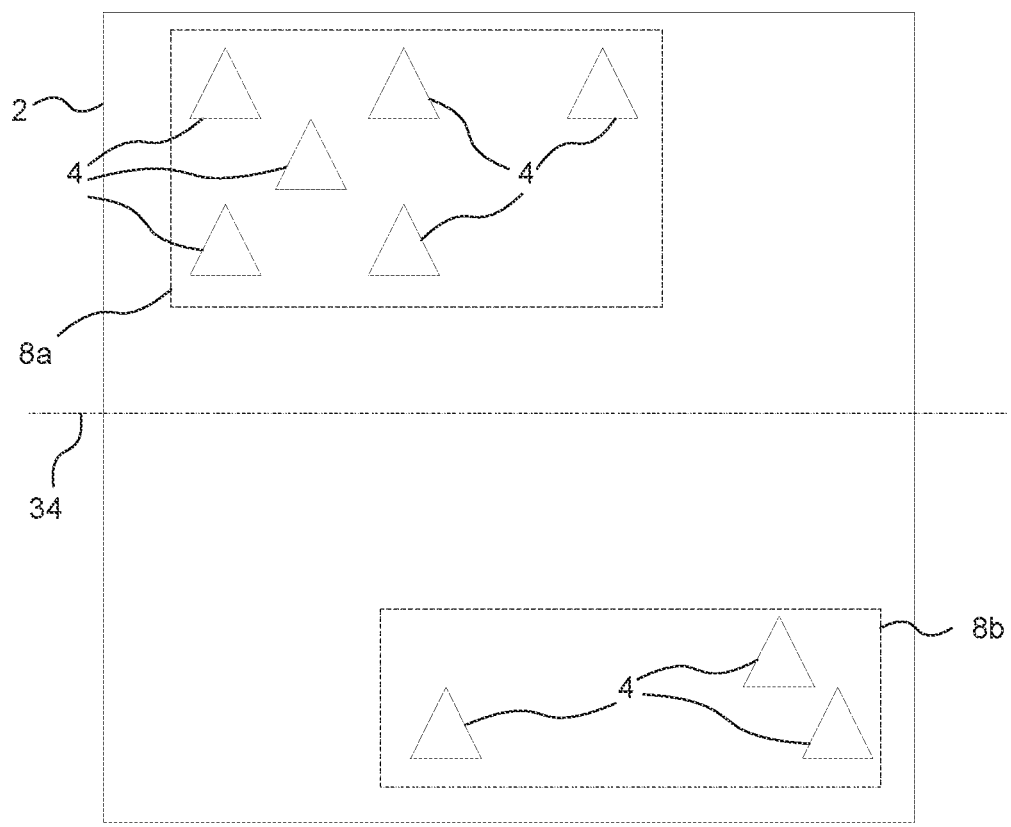
FIG. 6 shows a 2D view of a 3D scene similar to that of FIG. 3a, but with a partition used to guide the creation of the bounding volumes.
Figure 6:
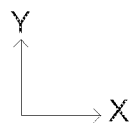

The examples described above and shown in FIGS. 4*a*-5*d* have the parent node 16 contain a number of primitives 4. The method used a set of two intermediary nodes, for example regions 8*a*/8*b* or 6*a*/6*b*, to group the primitives 4. The intermediary nodes bounding boxes 6*a*/6*b*, 8*a*/8*b* were able to extend across the full dimensions of the 3D scene 2. 3D scenes, however, may be larger and more complex than those shown in the above examples. For larger 3D scenes 2 and/or 3D scenes 2 with more complex arrangements of primitives 4, the 3D scene may be subdivided into portions and the bounding box regions selected by the method are confined to that portion. One example of this would be to divide the 3D scene 2 of FIG. 3*b* into two halves about an axis 34 extending along the X direction and located half-way along the 3D scene 2 in the Y direction. In other words, a horizontal line half-way along the Y direction. Such an axis 34 is shown in FIG. 6 which shows the 3D scene 2 of FIG. 3 with the axis 34. The axis 34 serves to partition the 3D scene 2 into a top portion and a bottom portion wherein the bounding region 8*a* is restricted to the top portion and bounding region 8*b* is restricted to the bottom portion. A similar dividing axis (not shown) extending vertically along the Y axis and half-way along the X axis may be used for the 3D scene in FIG. 3*a* to divide the 3D scene to left and right portions. The bounding box 6*a* would be confined to the left-hand portion whilst the bounding box 6*b* would be confined to the right-hand portion.

Figure 7A:
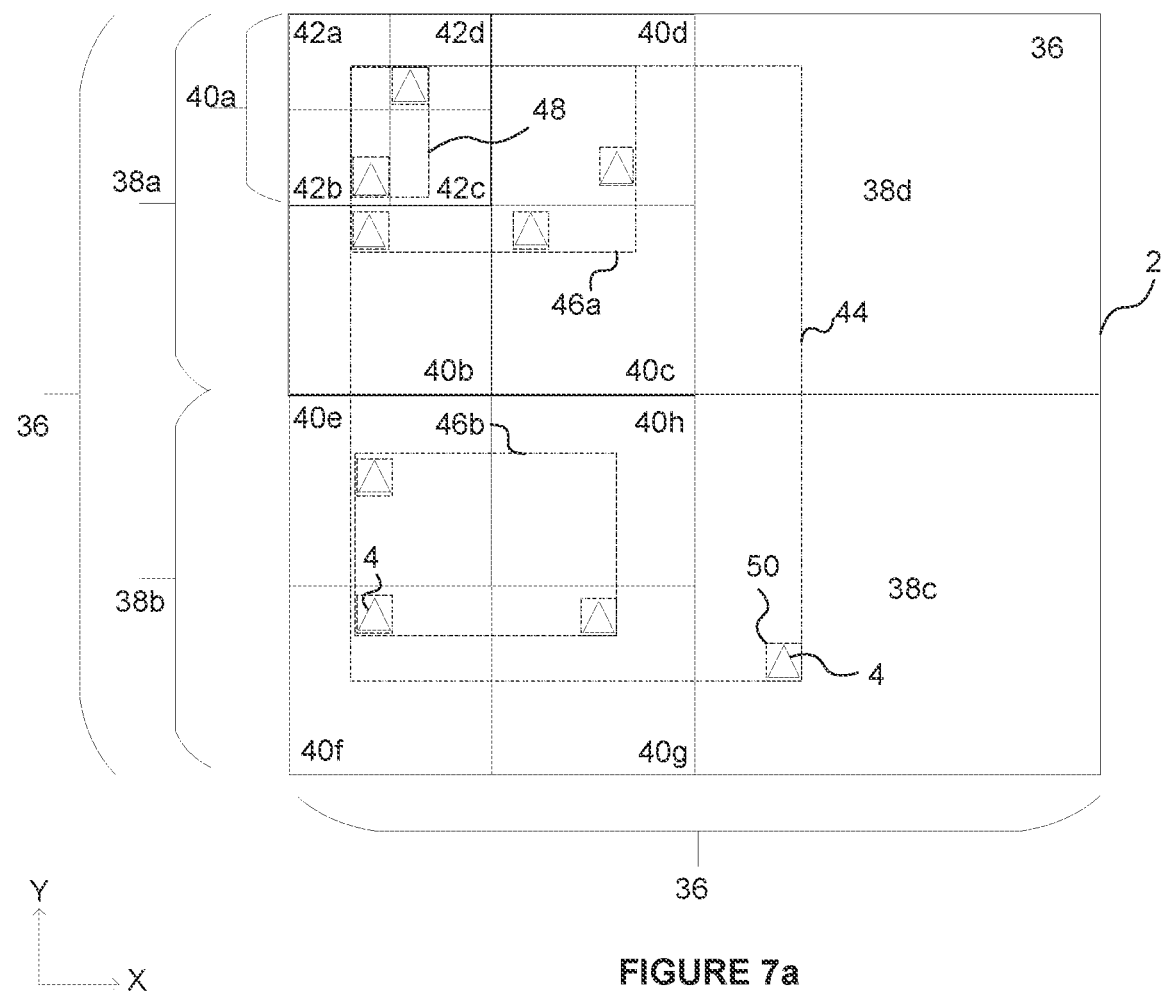
FIG. 7a shows another example of a 2D view of a 3D scene wherein a grid system is used to successively divide the 3D scene into octants.

For larger, or more complex 3D scenes, the method may first create an underlying octree structure that recursively subdivides the 3D scene 2 into eight portions at each level. The underlying octree structure guides the creation of the regions that bound the primitives of the 3D scene. The octree structure is typically formed by recursively halving volumes in each of the three spatial directions (e.g., along X, Y and Z axes) thereby subdividing the 3D space at a particular node level into eight equal sub portions starting with a volume containing the entire scene. Each level of this octree may be thought of as a voxel grid, having voxels with sides half the size of the level above. FIG. 7*a* shows an example of a 3D scene with an underlying octree structure. The figure only shows a 2D perspective (X, Y plane) of the 3D scene, however it is understood that the 3D scene also has depth in the Z direction. For this present discussion, we will only be considering the structure and primitives 4 of the 2D view shown in FIG. 7*a*.

There now follows underneath a description of the different levels of detail of the octree structure shown in FIG. 7*a*. At the top level of detail, a single volume 36 covers the whole 3D scene containing nine primitives 4, which are all triangles in this example. At the next level of detail down there are eight child volumes including the four visible child volumes in FIG. 7*a* of 38*a*, 38*b*, 38*c*, 38*d*, which are all equal in size. Only the volumes 38*a*, 38*b*, 38*c* contain primitives 4 wherein volume 38*a* contains five primitives 4; volume 38*b* contains three primitives 4; volume 38*c* contains one primitive 4.

Both of the volumes 38*a* and 38*b* have multiple primitives located about their volume. Therefore, at the next level of detail down the system has applied a further octree structure to each of volumes 38*a* and 38*b*. For example, the are eight child volumes of volume 38*a* which include the four visible child volumes in FIG. 7*a* of 40*a*, 40*b*, 40*c*, 40*d*. A similar set of child volumes 40*e*, 40*f*, 40*g*, 40*h* are also applied to volume 38*b*. Volume 40*a* again has multiple primitives 4 about its volume, therefore a further octree structure has been applied to volume 40*a* providing eight child volumes of parent volume 40*a* which including the four visible child volumes in FIG. 7*a* of 42*a*, 42*b*, 42*c*, 42*d*.

With the above voxel structures, each primitive 4 is now contained within a single volume and the application of further octree structures to the scene stops. In principle however, this sequential subdivision may carry on until, for example, the volume sizes become comparable to the size of the smallest primitive. Not every volume may need to be subdivided into further child volumes at each level. For example, volume 38*d* has no primitives and therefore requires no further subdivision.

Figure 7B:
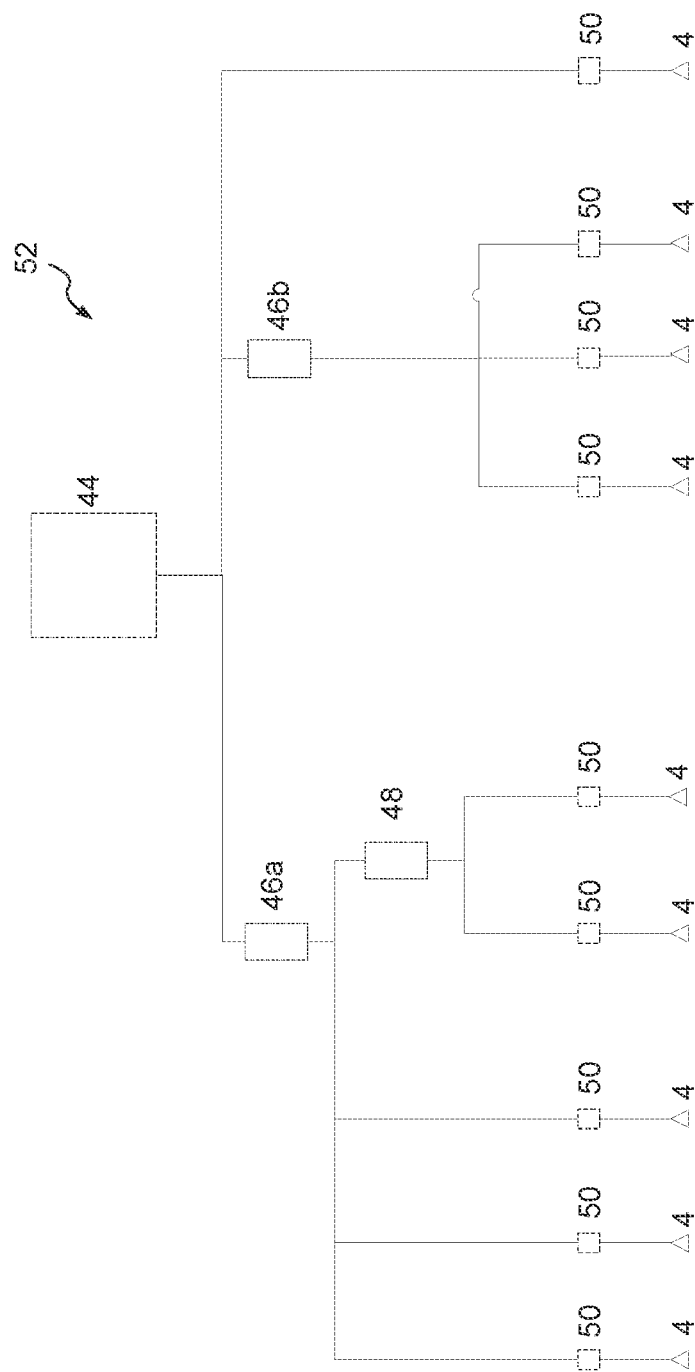

This underlying octree structure may be used to guide the generation of bounding regions used in the hierarchical acceleration structure at different node levels. These bounding regions correspond to the nodes of the hierarchical acceleration structure 52 for this scene 2, shown in FIG. 7*b*. At the highest (root) node level the volume 36 covers the whole of the 3D scene 2. Within this volume 36 the bounding region 44 is created. This bounding region 44 is an AABB containing within its volume all of the primitives 4 within the scene 2. In this example, each primitive in the scene 2 is bounded by its own individual bounding region AABB 50, which is a leaf node of the acceleration structure. The leaf node bounding region AABB 50 is only labelled for the primitive 4 in volume 38*c*, however the other AABBs closely surrounding other singular primitives 4 in the scene are also leaf node AABB's 50. At the next node level down from the root node are the volumes 38*a*, 38*b*, 38*c*, 38*d*. Volume 38*a* contains five primitives 4. A bounding region 46*a* is generated to enclose all of the primitives 4 in this volume. Volume 38*b* contains three primitives 4. A bounding region 46*b* is generated to enclose all of the primitives 4 in this volume. Volume 38*c* contains one primitive 4 which is leaf node 50 of the acceleration structure. Volume 38*d* contains no primitives 4. At the next node level down, volumes 40*b*, 40*c*, 40*d*, 40*e*, 40*f* and 40*g* each have a single primitive 4 enclosed by its own leaf node 50 bounding region 50. Volume 40*a*, however, contains two primitives 4 and has a bounding region 48 enclosing them. At the next node level down volumes 42*b* and 42*d* each have a single primitive 4 bounded by a leaf node bounding region 50.

Figure 7C:
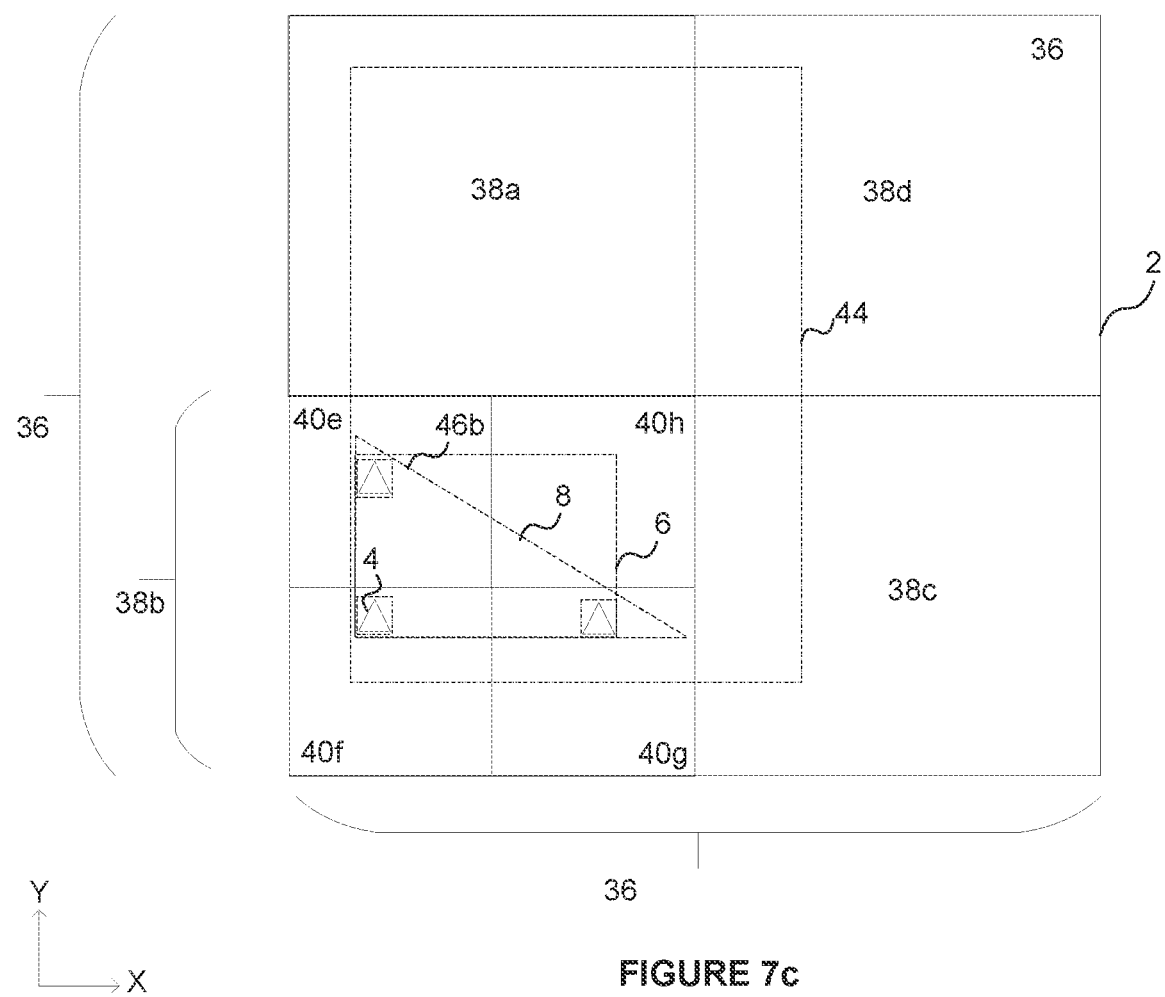
FIG. 7c shows a 2D view of the 3D scene of FIG. 7a, focusing only on the primitives in one portion of the 3D scene, and showing different shaped bounding volumes.

FIG. 7*c* shows the 2D view of the 3D scene of FIG. 7*a* with the primitives 4 and bounding volumes removed for volumes 38*a* and 38*c*, for purposes of discussion. In FIG. 7*c* we focus on the bounding regions for the primitives in volume 38*b*. Recalling that, as described above, when developing the hierarchical acceleration structure, the method may generate at least a first 6 and a further 8 bounding region and then select between them by comparing direction associated data of each region. The selection between bounding regions may include selecting between regions of different shapes. For example, the method may be applied, for the volume 38*b*, which, contains three primitives 4 and is a child of parent volume 36. In this particular example, in FIG. 7*c*, the method allows for different shaped bounding regions where, in this example, the first bounding region 6 is a box and the further bounding region 8 has a right-angled triangular shape in the 2D view of the 3D scene 2. It is assumed this right angled triangular-shaped bounding region 8 is wedge shaped and extends the same depth into the page as the AABB bounding region 6. As in previous examples, if the method is again selecting the bounding region, 6 or 8, with the smallest surface area facing the Z direction (into the page), the method would select the second bounding region 8 because it presents the least visible area in the Z direction for the same number of bound primitives. In this example, this bounding region would be selected as the bounding region 46b for the hierarchical acceleration structure for the Z viewing direction.

FIG. 7c shows an example application of the method where a single region is chosen between two alternative regions 6, 8 and where a full octree structure is applied to a volume if multiple primitives 4 are contained within the volume. For purposes of discussion, the child volumes of a parent volume of the octree are termed 'octants', for example the parent volume 38b has eight child octants including the four visible octants 40e, 40f, 40g, 40h in FIG. 7c. As described above, FIG. 7c shows only four of the child octants, octants 40e-h, of the eight child octants of the parent volume 38b, however it should be appreciated that the other four child octants of volume 38b also exist. The underlying voxel grid structure applied as an octree means the resulting number of bounding regions of the acceleration structure can grow large, for example eight child bounding regions (hence, one for each volume octant). When the hierarchical acceleration structure is subsequently used in ray tracing intersection testing, the testing of multiple sets of up to 8 child bounding regions, corresponding to 8 child octants, can become computationally expensive. For example, in FIG. 7a, bounding region 46b extends across all four visible octants 40e-h, with octants 40e, 40f and 40g containing AABBs 50 (corresponding to leaf nodes) with primitives. Therefore, if a ray were to hit bounding region 46b, because all of the three primitives 4 in that bounding region 46b are each in a separate octant, 40e, 40f, 40g, then each bounding region AABB 50 around each primitive will need to be separately tested to see if the ray further hits it and, if so, further tests will be performed on any of the three primitives 4 found to be within an intersected AABB 50. If volume 38b had many more primitives 4 in all eight of its child octants, with a bounding region within each octant, then at least eight lots of intersection testing—one for each octant—would need to be performed (and more than eight lots of intersection testing would be performed if those octants were further sub-divided) before also performing intersection testing on any primitives 4 contained in intersected octants at the lowest level of detail, to see which, if any, of the primitives were hit by the ray. It may therefore be advantageous to reduce the number of bounding regions tested at each particular node level. One way of reducing the number of intersection tests is described below with respect to FIGS. 7d and 7e. Counterintuitively, it can be useful to add further bounding regions to reduce the number of intersection tests. For example, by adding an intermediate level of e.g., two bounding regions, each containing four bounding regions at the level below, it is possible to determine that four lower-level bounding regions are missed by only testing the two (new) intermediate level bounding regions and establishing that one of the intermediary bounding regions is missed.

Figure 7D:
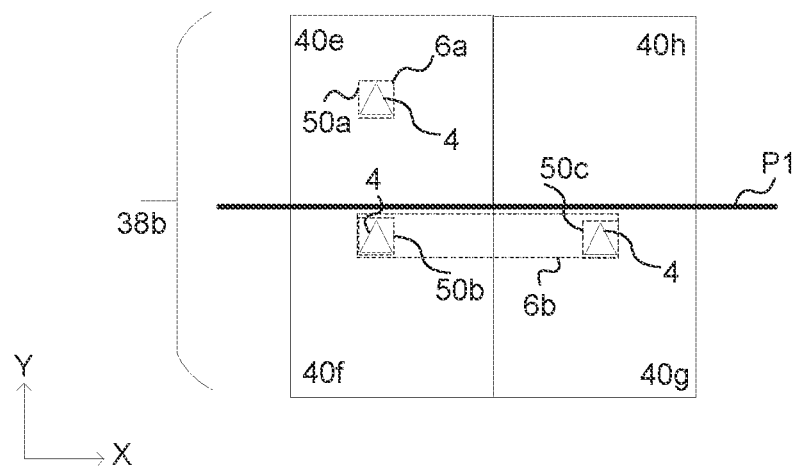
FIGS. 7d and 7e show the portion of FIG. 7c with two alternative sets of bounding regions.
Figure 7E:
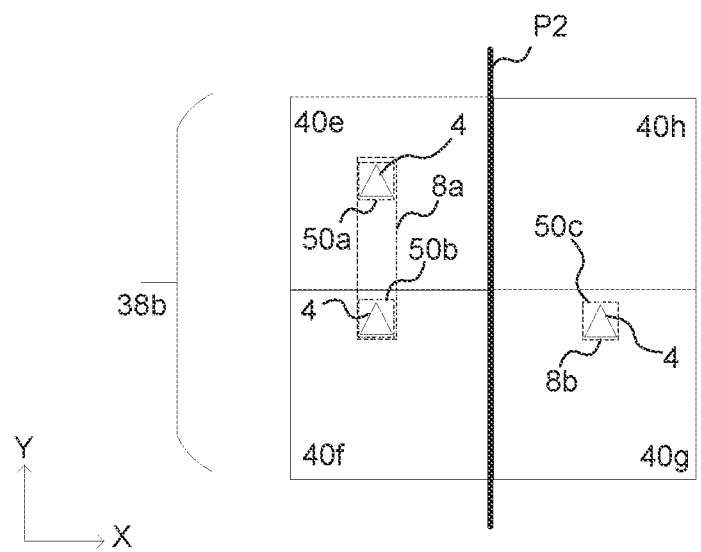

FIGS. 7d and 7e focus on the volume 38b of FIG. 7a and relate to a further example of the method. In this example we are assuming that the three primitives 4 in the parent volume 38b are in the visible child octants 40e, 40f, 40g and are located on the same X-Y plane in the Z direction (into the page) so they are in the same position along the z axis (into the page). In this example, instead of the volume 38b being split into child octants to determine the next level of bounding volumes, the volume 38b is only split into two child portions. This process of creating an intermediate level with further bounding regions may take place during the initial creation of the acceleration structure, or after the initial acceleration structure is formed, i.e., post-process BSP optimisation. In principle, the volume may be split into any number of child volumes such as 2, 3, 4, 5, 6, 7, 8 or more child volume wherein the child volumes may be the same or different in size, however in this example we use a binary split into two equal portions of the scene 2, which may be referred to as a binary space partition (BSP). A BSP can therefore be used to generate possible partitions of longer child lists, from which intermediary boxes/regions could be defined and used to create a hierarchical structure with more node levels. The volume 38b may be split into two scene portions in a number of ways. In this example we are considering partition axes aligned to the X and Y axes, however other axes may be considered such as along Z or along a diagonal of the volume 38b. The example here assumes the boxes constituting the volumes are aligned with the X, Y, Z axes of the 3D scene shown in the figures, however the volume may, in principle, take any shape or orientation with the 3D scene. In general, therefore the partition axes may be aligned to a relative axis of the volume itself along a plane parallel to an axis of the volume; the volume axis in this regard is interpreted to mean being along an edge of the volume (e.g., a box) that adjoins two faces of the volume.

In the following discussion the scene volumes such as 38b may be referred to as voxels. In FIG. 7d, partition axis P1 runs along the X-Z plane and is positioned halfway along the Y direction for voxel 38b. This results in a top half portion of the scene 2 of voxel 38b and a bottom half portion of the scene 2 of voxel 38b. In FIG. 7e, alternative partition axis P2 runs along the Y-Z plane and is positioned halfway along the X direction for voxel 38b. This results in a left-hand half portion of the scene 2 of voxel 38b and a right-hand half portion of the scene 2 of voxel 38b. If the partition P1 is used then the method determines a set of two bounding regions 6a, 6b for the voxel 38b. Bounding region 6a covers primitives 4 for the top half portion, which in this example is only one primitive 4, which is the leaf node AABB 50a. Bounding region 6b covers primitives 4 for the bottom half portion, which in this example are the two primitives 4 captured by respective leaf node bounding AABBs 50b and 50c. If the partition P2 is used then the method determines a set of two bounding regions 8a, 8b for the voxel 38b. Bounding region 8a covers primitives 4 for the left half portion, which in this example are two primitives 4 captured by respective leaf node bounding AABBs 50a and 50b. Bounding region 8b covers primitives 4 for the right half portion, which in this example is the single primitive 4 captured by leaf node AABB 50c. In other words, for a given portion of the image scene 2 represented in this case by voxel 38b, the method uses a first partition P1 in FIG. 7d defining a first sub portion and second sub portion, whilst in FIG. 7e the method uses a second partition P2 defining a third sub portion and a fourth sub portion. Each of the first, second, third and fourth sub portions occupy a different volume of the image scene portion of voxel 38b. Each of these sub portions of the scene bounds the same or a larger volume of the 3D scene than the respective bounding AABB regions 6a, 6b, 8a, 8b created within them.

To recall, the method may select between a first set 6a, 6b and a second set 8a, 8b of bounding regions to be used in the hierarchical acceleration structure, for a particular direction, which in this example is a viewing direction about the 3D scene 2. The selection of the first 6a, 6b or second set 8a, 8b of bounding regions may be based on data associated with the bounding regions themselves and the associated direction. In this example we consider two viewing directions: a viewing direction along X and a viewing direction along Y. The data we are comparing the sets with is the combined surface area presented by the bounding regions when looking along the said viewing directions. In other words, taking the X direction, the combined surface area facing the X direction of regions 6a and 6b compared to the combined surface area facing the X direction of regions 8a and 8b.

When viewing along the X direction, FIGS. 7d and 7e show that the set of bounding regions 6a and 6b have less surface area presented to the X direction than regions 8a/8b because region 8a extends along the Y direction between leaf nodes 50a and 50b, thus presenting a larger surface area. The method in this example will therefore select the regions 6a and 6b to form two nodes at the same intermediate node level in the hierarchical acceleration structure for the X viewing direction.

Figure 7F:
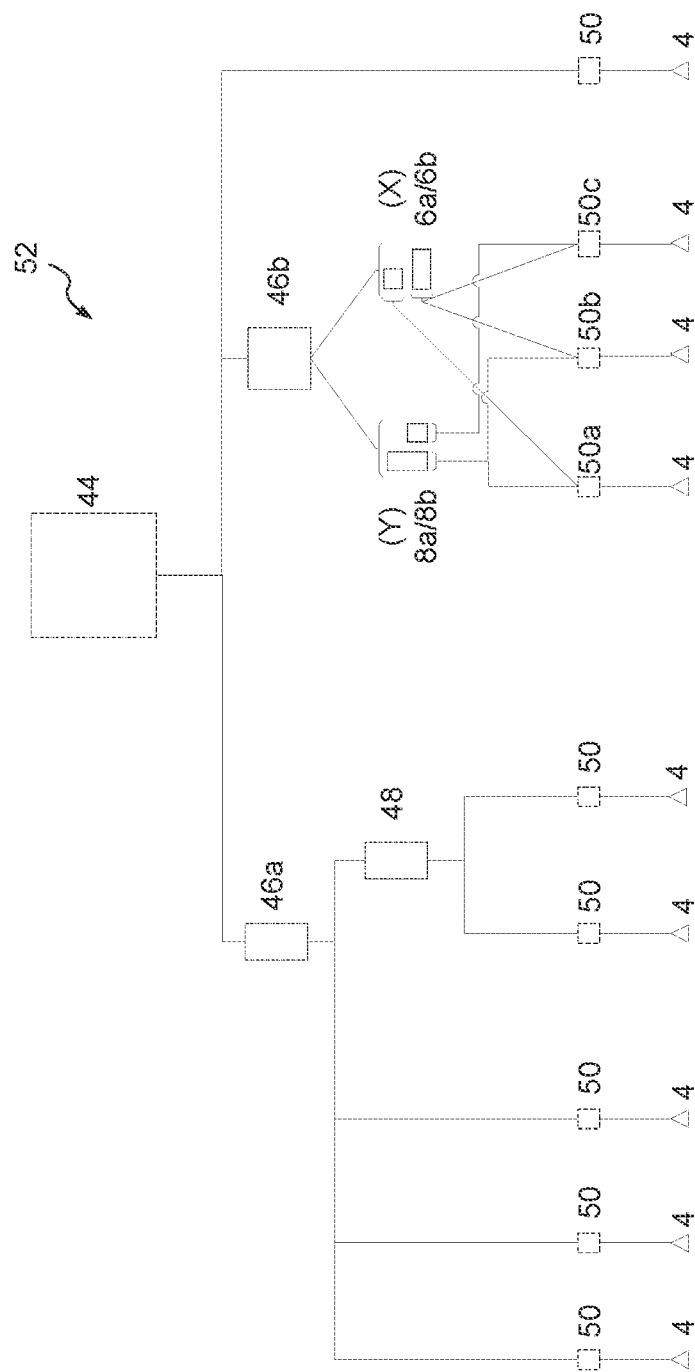
FIG. 7f shows a tree topology hierarchical acceleration structure using nodes created from the bounding regions shown in FIGS. 7d and 7e.

When viewing along the Y direction, FIGS. 7d and 7e show that the set of bounding regions 8a and 8b have less surface area presented to the Y direction than regions 6a/6b because region 6a extends along the X direction between leaf nodes 50b and 50c, thus presenting a larger surface area. The method in this example with therefore select the regions 8a and 8b to form two nodes at the same intermediate node level in the hierarchical acceleration structure for the Y viewing direction. The nodes represented by the region set 6a/b and region set 8a/8b for the different viewing directions become further intermediate branches of the hierarchical acceleration structure 52 as shown in FIG. 7f. In FIG. 7f, the regions 6a and 6b are shown clustered together but act as separate intermediary nodes for the X direction. Similarly, in FIGS. 7f, regions 8a and 8b are shown clustered together but act as separate intermediary nodes for the Z direction. A similar analysis may be used to create hierarchical acceleration structure nodes, at the same node level, for the Z direction or any other direction which in turn will form other intermediate branches. For example, a hierarchical acceleration structure may include a set of four intermediate branches for the same portion of the 3D scene 2: an X-direction branch; a Y-direction branch; a Z-direction branch; and a view-independent universal branch wherein the BSP was created without comparing the surface areas in a particular direction (this universal branch may be generated by selecting bounding regions with the smallest bound volume or the smallest overall surface area or any another metric). The above description discusses one pass of BSP for a given voxel. It is noted that this process may be undertaken for other voxels at the same detail level and/or other voxels at higher or lower detail levels. It is also noted that multiple passes of BSP can be carried out on the same original voxel. For example, for the above discussed voxel 38b, after partitioning voxel 38b along X to create a first new intermediate level of two nodes, the new child lists could be shortened again by applying another BSP (in Y or Z). This would then create a second new level of nodes. For example, if the initial acceleration structure had the voxel 38b as an original parent level and its eight octant children, including 40e-h, formed the original child node level, then by applying the above-mentioned BSP process twice creates two further intermediate node levels listed as follows with respect to the original parent and child node levels:

L1. Original parent;
L2. Intermediate nodes from splitting along x;
L3. Intermediate nodes from splitting along y (or z);
L4. Original child nodes.

As discussed previously, when the method completes the formation of the acceleration structure 52, it then uses this structure in performing the process of traversing the rays through the scene 2. Take the example in FIGS. 7d, 7e and 7f, and the ray tracing system traversing a particular ray through the portion of the scene 2 in voxel 38b. The system may evaluate the direction of the ray to see if it corresponds to any of the X and Y directions. This comparison of the ray direction to a direction associated with a particular branch in the acceleration structure determines which branch of the acceleration structure is used to perform intersection testing of the ray. In making that decision the ray direction may be required to have the same direction or set of directions associated with that branch. Indeed, a set of directions or set of hypothetical ray angles may be used to determine the data used to compare the alternative regions 6a/6b, 8a/8b when creating the particular branches of the acceleration structure, which is further discussed underneath. The ray direction may be required to have a direction within a tolerance of the said branch direction, for example plus or minus 10 degrees about the said branch direction. For example, with a plus/minus 10-degree angle tolerance, if the system determined that the ray was angled at 5 degrees from the X-axis direction, the ray would be selected to use the intermediate branch of FIG. 7f having regions 6a and 6b. If a ray's direction about a portion of the scene 2 were outside any of the acceptable angles for any of the direction-optimised branches (such as branches with nodes 6a/6b and 8a/8b in FIG. 7f, then the system may choose to not use any binary space partitions or use a universal branch as discussed above. For example, if a ray were directed into the voxel 38b at an angle of 45 degrees from each of the X, Y, Z axes, then the system would use a universal branch as discussed above (but not shown in the figures).

Although the above example in FIGS. 7a-f only uses voxel 38b to apply BSP, BSP or any other partitioning to create further nodes of the acceleration structure, may be applied to any portion of the 3D scene 2 such as another voxel at the same node level, a parent voxel such as the root voxel 36 in FIG. 7a or a child voxel such as voxel 40a of FIG. 7a.

As discussed in the examples above, the method selects one or more bounding regions to be used in the hierarchical acceleration structure based on direction-optimised data of those regions. Previous examples have used surface area data, in particular the surface area presented to the viewing direction of interest. For example, when using AABBs for the bounding regions, previous examples have only used the surface area of the one side of each AABB to make this comparison. In principle, each of the first region/s 6 and further region/s 8 may be a shape comprising a plurality of faces, with the previous examples showing AABBs and triangular/wedge shapes. As mentioned, although a single face has been used in the previous examples to determine the first and further data used for comparing and selecting the region for the acceleration structure, each of the first and further data respectively associated with the first and further regions may comprise a value associated with at least one of the faces of the respective regions. Each of the data values may be associated with at least two of the faces of the respective regions. Preferably, where the common direction is one of a set of directions, such as a cone of directions, each of the first and further data respectively associated with the first and further regions may comprise a data value associated with: a) a primary face of the respective region; and b) one or more secondary faces, for example, each face adjoining the primary face.

For example, for a bounding region 6, 8 shaped as a box, the primary face may be the face most prominently facing the hypothetical ray direction whilst the other secondary adjoining faces are those directly adjacent to the primary face and connect to the primary face along the edges of the box defining the primary face. In this description of directions and region faces we may assume that: a) the common direction corresponds to an incident angle of one or more hypothetical rays entering a portion of the 3D scene containing the first and further regions; and that b) each of the faces of the region that are associated with the respective data values may at least partially face the one or more hypothetical rays. The primary face of the region, for a given direction or set of directions, may also be defined as the face having the largest surface normal component (compared to the other faces) facing towards the hypothetical ray travelling towards the said face along the direction. The data value, for a particular region 6, 8 may be determined by applying a weighting factor to the area of at least two of the faces wherein the area of at least one face is weighted differently to that of another face, for example the primary face is weighted higher than the other secondary faces. This is further explained below.

Figure 8A:
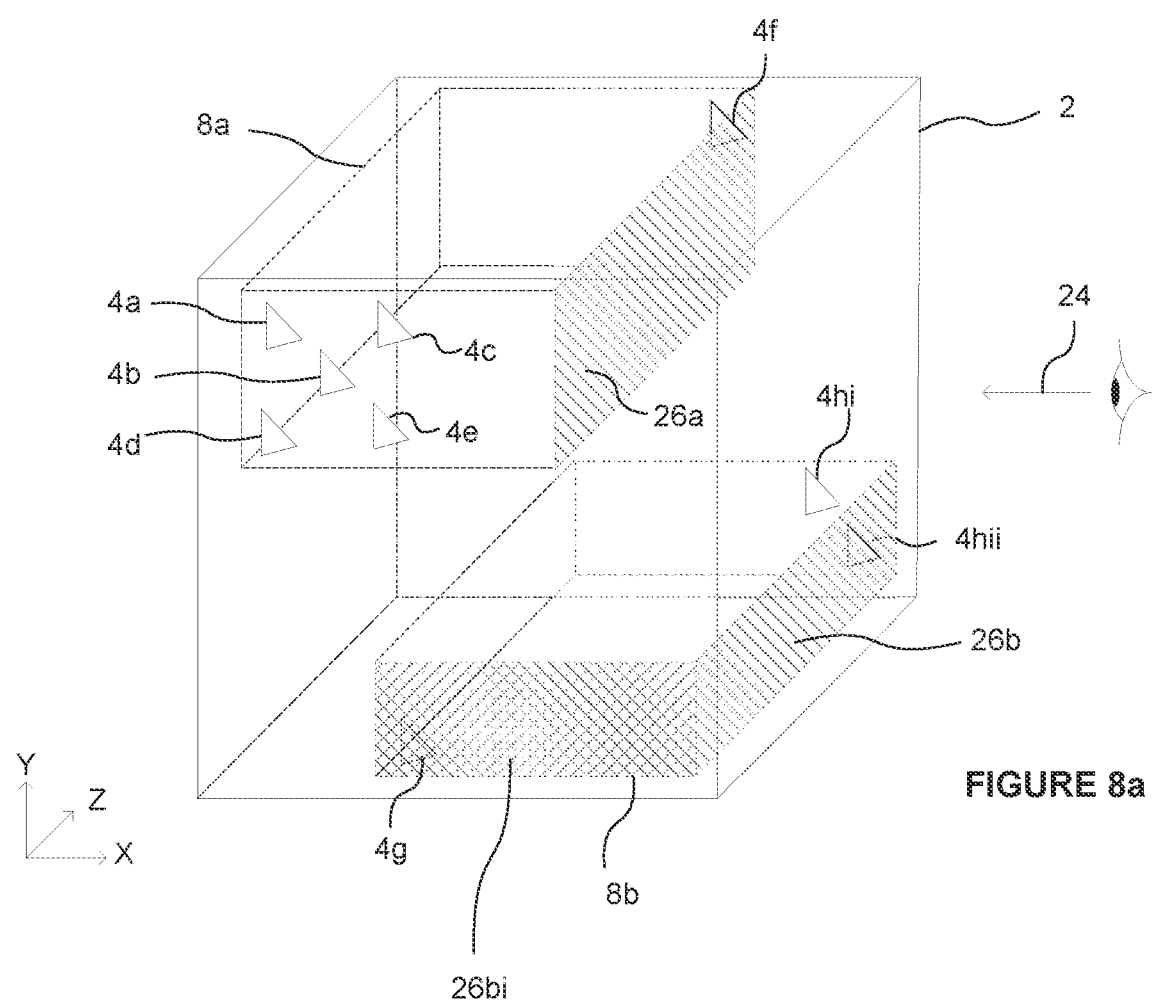
FIG. 8a shows a 3D scene similar to that of FIGS. 5a and 5b highlighting different surfaces of a bounding region.

Rays may come into 3D scenes at different angles that are not just exactly along the X, Y or Z axes. Because of this the data used to compare the different alternative bounding regions such as 6a/6b or 8a/8b described in examples above, may be derived using a heuristic such as a surface area heuristic that takes into account more than just the surface area of a single side of an AABB that faces the target direction. The data used for the comparison may therefore be generated using the surface area of the bounding volume side directly facing the hypothetical ray direction plus a weighted proportion of the surface areas of other sides of the same bounding volume. As described above these 'other sides' may be termed secondary sides whilst the main side the hypothetical ray angle 'sees' is the primary side. These other sides may be the sides of the bounding volume adjoining the nominal facing side. To illustrate this concept, FIG. 8a shows the example of FIG. 5a having a hypothetical primary ray direction/angle 24 directly along the negative X axis of the 3D scene 2. The surface 26b of AABB region 8b faces the negative X direction and is the main surface area facing the target direction of this AABB. The adjoining surfaces that may further contribute to the surface area heuristic are those extending adjacent from the main surface 26b towards the opposite rear surface of the AABB region 8b. Surface 26bi is one such surface and is represented by a crosshatch in FIG. 8a. The other surfaces that may contribute to the surface area heuristic in this example are the opposing side surface to surface 26bi, and the top and bottom surfaces of the AABB region 8b.

The weighting of the contribution of these other surfaces may vary. This variance may be selected for different reasons including the desired range of hypothetical ray angles that the ray tracing system will use the node for. For example, if the ray tracing system is set up to only use the X and Y branches in FIG. 7f for rays just (and only) along the respective X and Y directions only, then the method may select the regions simply using the surface area of the single AABB side facing that direction. If, however the ray tracing system is set up to use the X and Y branches in FIG. 7f for rays directed mainly along the respective X and Y directions plus or minus 10 degrees off these axes, then the adjoining AABB surfaces have also to be taken into account because there is a chance that, for example, a ray coming in at 5 degree angle to the X axis may hit one of these adjoining sides of the AABB.

The methods described herein may use a heuristic to determine the view-dependent selection of bounding regions. There now follows an example of how to determine surface area data for the method where the regions are AABBs. The heuristic described below accounts for a range of possible viewing directions. This exemplified method is not intended to be limiting and other ways of determining a heuristic (view-dependent or otherwise), for example a view-dependent surface area heuristic (SAH) may be used. For this example, the SAH is used to guide the construction of Bounding Volume Hierarchies (BVH), in order to achieve higher efficiency when ray tracing a scene.

Figure 8B:
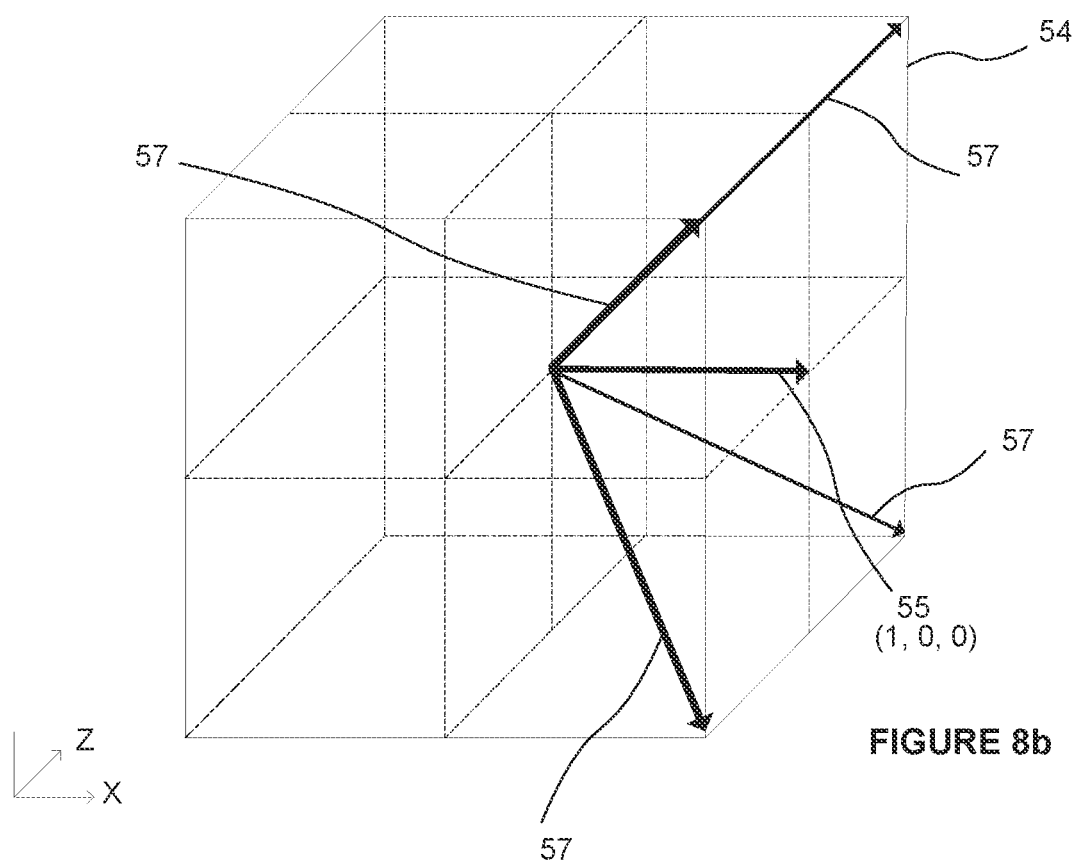
FIG. 8b shows an example of the extents of the viewing angles projected in the Y and Z axes.

In the following heuristic we consider directed rays with major components and assume that for a given AABB there are three pairs of faces, i.e., those corresponding to the X, Y and Z axes. Each pair have areas, P, Q & R, respectively. A given ray (or set of rays) has a direction (DX, DY, DZ). The development of the heuristic starts by considering all direction vectors which have a given largest magnitude component, e.g., $Dx \geq |Dy|$ and $Dx \geq |Dz|$ as shown in FIG. 8b, In FIG. 8b there is shown a cube 54 with unit distance from the cube centre to each side directly along any axis X, Y, or Z wherein reference 55 is a vector (1,0,0) and references 57 indicate the range of directions where X is greater than or equal to the modulus of Y and Z. In the following discussion deriving the heuristic it is assumed that Dx is the major component and is positive. In FIG. 8b, the angle between the primary (X) axis and a diagonal/edge of the pyramid is ~55°, and 450 relative to the central axis-aligned planes.

Figure 8C:
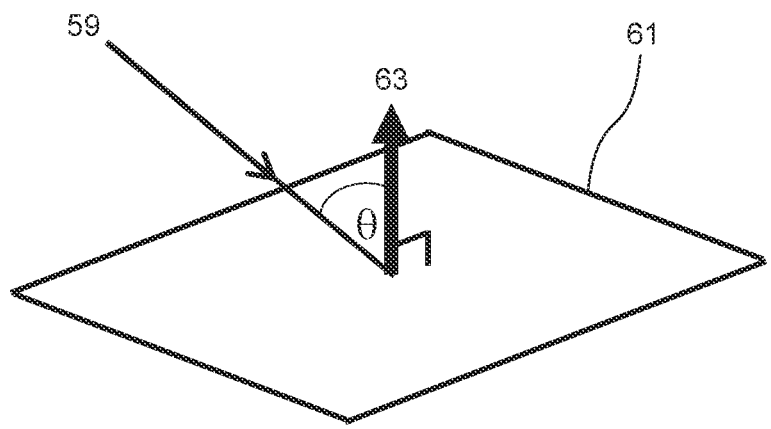
FIG. 8c shows a projected area from given view direction.

FIG. 8c shows a projected area from given view direction 59. With reference to FIG. 8c, we consider any planar surface 61, e.g., a rectangle, with a given area, Y. When seen from a given viewing direction 59 that has an angle 6 relative to the surface normal 63, the projected area of that surface is Y cos(6). Thus, if the viewing ray direction, D, and the surface normal, N, are both unit vectors, then the scaling factor for the area of the surface is given by D.N. The total apparent surface area of the AABB for a given unit viewing direction, D, (i.e. a weighted area) is provided in equation 1.

$$\text{WeigtedArea}_D = |D_x|P + |D_y|Q + |D_z|R \quad \text{[Equ. 1]}$$

We now consider an arbitrary ray in the set with a dominant axis, for example, any contained in the pyramid defined by the four vectors 57 in FIG. 8b. Any such ray direction can be scaled to become as (1, y, z), where $1 \geq |y| \geq 0$ and $1|z| \geq 0$, and thus the sum of the projected surface areas for that ray direction will be given by equation 2.

$$\text{Area}_{projected} = \frac{P + y \cdot Q + z \cdot R}{\sqrt{1 + y^2 + z^2}} \quad \text{[Equ. 2]}$$

Figure 8D:
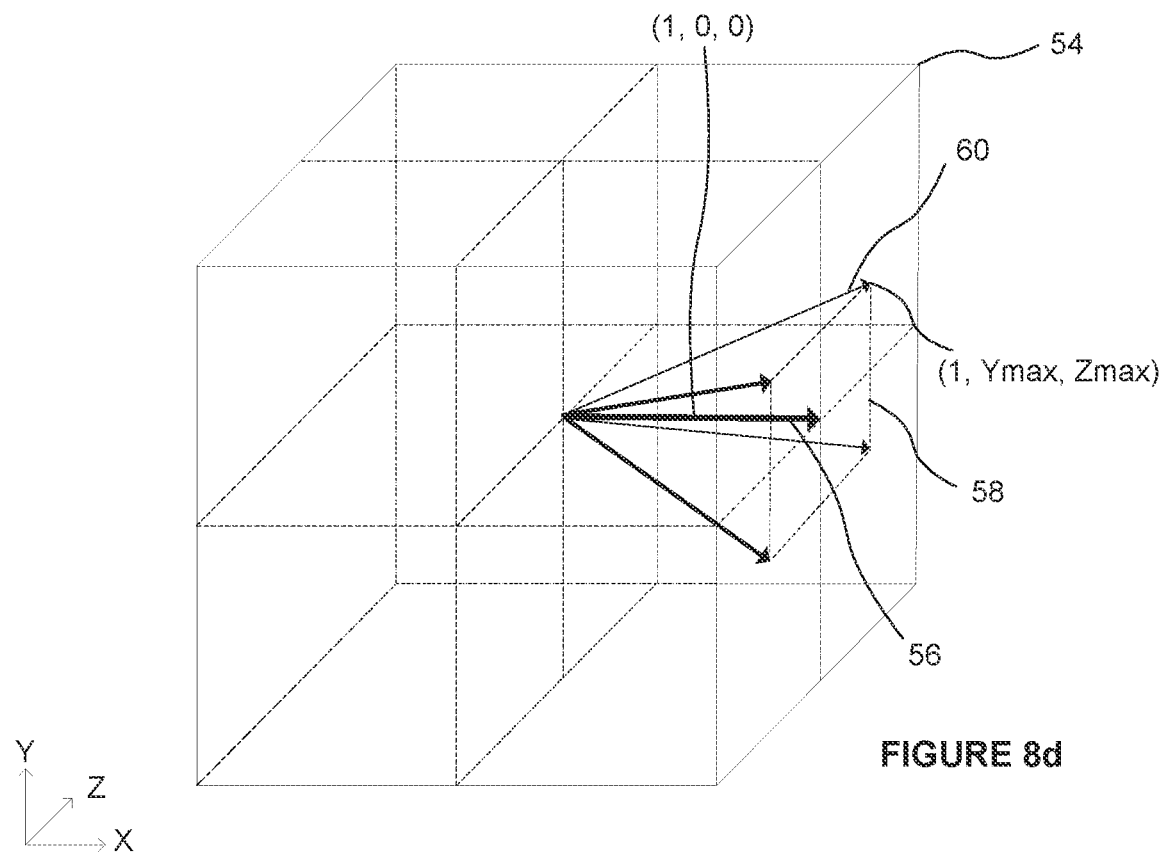
FIG. 8d shows a cube with unit distance from the cube centre to each side directly along any axis X, Y, or Z.

The development of the heuristic now turns to the computation of the average weight. The above derivation of equations 1 and 2 gives the weights for a single direction, but we wish to know the weights for an average direction within a given range. To do this we can equate the angular viewing direction about the X axis to the extent the viewing range projects onto a plane surface. This is represented in FIG. 8d which shows a cube 54 with unit distance from the cube centre to each side directly along any axis X, Y, or Z. Arrow 56 extends one unit vector in the X direction from the cube centre onto the cube surface with the arrowhead centring a region 58 defined by outer viewing directions 60. The weights for an average direction within a given range can be determined, for a subregion extending from the central axis 56, as shown in FIG. 8$d$, by projecting each ray onto to the surface of a unit sphere, using the partial derivatives to define an 'infinitesimal' area on the sphere corresponding to the ray, and using that area to integrate/create a weighted sum.

We begin by defining an expression for an arbitrary unit vector, D, in the included region as defined in equation 3 wherein the partial derivatives of D with respect to y and z are given in equation 4 and 5.

$$\overline{D(y,z)} = \frac{1}{\sqrt{1+y^2+z^2}}[1, y, z] \quad [\text{Equ. 3}]$$

$$\frac{d}{dy}\overline{D(y,z)} = \left[\frac{y}{\sqrt{(1+y^2+z^2)^3}},\right.$$

$$\left.\left(\frac{y^2}{\sqrt{(1+y^2+z^2)^3}} + \frac{1}{\sqrt{1+y^2+z^2}}\right), \frac{yz}{\sqrt{(1+y^2+z^2)^3}}\right] \quad [\text{Equ. 4}]$$

$$\frac{d}{dz}\overline{D(y,z)} = \left[\frac{z}{\sqrt{(1+y^2+z^2)^3}},\right. \quad [\text{Equ. 5}]$$

$$\left.\frac{yz}{\sqrt{(1+y^2+z^2)^3}}, \left(\frac{z^2}{\sqrt{(1+y^2+z^2)^3}} + \frac{1}{\sqrt{1+y^2+z^2}}\right)\right]$$

Further it is known that area of a parallelogram (in 3D) with adjacent sides, A, B, is given by equation 6 which represents the length of the vector cross product of the sides.

$$A_{pg} = (\overline{A}, \overline{B}) = \|\overline{A} \times \overline{B}\| \quad [\text{Equ. 6}]$$

Thus, the infinitesimal area for a vector D can be computed by taking the magnitude of the cross product of the partial derivatives, which leads to the expression in equation 7.

$$A_D(y,z) = A_{pg}\left(\frac{d}{dy}\overline{D(y,z)}, \frac{d}{dz}\overline{D(y,z)}\right) = \frac{1}{\sqrt{(1+y^2+z^2)^3}} \quad [\text{Equ. 7}]$$

Further, this can be used to compute the area of the included region on the surface of the sphere. For example, we can then obtain ¼ of the included surface area. i.e. from the central axis 65 to a corner, e.g. 60, with equation 8.

$$SphericalQtrArea(y_{max}, z_{max}) = \int_0^{z_{max}} \int_0^{y_{max}} A_D(y,z)\, dy\, dz \quad [\text{Equ. 8}]$$

We now turn to the P, Q and R weights. A calculation can be made for the weights for an average direction within a given range. If the ray (or set of rays) is primarily in the X axis then the weightings of the surface areas of the faces P, Q, and R (weights for the surfaces for an average direction within a given range Ymax, Zmax), following from the above equations, may be represented as follows in equations 9-11.

$$P_{weight}(Y_{max}, Z_{max}) = \frac{1}{SphericalQtrArea(y_{max}, z_{max})} \quad [\text{Equ. 9, 10, 11}]$$

$$\int_0^{Z_{max}} \int_0^{Y_{max}} \frac{1}{\sqrt{1+y^2+z^2}} A_D(y,z)\, dy\, dz$$

$$Q_{weight}(Y_{max}, Z_{max}) =$$

$$\frac{1}{SphericalQtrArea(y_{max}, z_{max})} \int_0^{Z_{max}} \int_0^{Y_{max}} \frac{y}{\sqrt{1+y^2+z^2}} A_D(y,z)\, dy\, dz$$

$$R_{weight}(Y_{max}, Z_{max}) =$$

$$\frac{1}{SphericalQtrArea(y_{max}, z_{max})} \int_0^{Z_{max}} \int_0^{Y_{max}} \frac{z}{\sqrt{1+y^2+z^2}} A_D(y,z)\, dy\, dz$$

Note for ymax=zmax=1, the spherical area is, of course, ¼×⅙ of the surface area of a unit sphere, i.e. π/6. However, because we are only interested in the relative weights for the 3 directions, we can discard the scale by 1/SphericalArea (ymax, zmax). Without the scaling, the above can be simplified to the equations 12, 13 14.

$$P'_{weight}(Y_{max}, Z_{max}) = \int_0^{Z_{max}} \int_0^{Y_{max}} \frac{1}{(1+y^2+z^2)^2}\, dy\, dz \quad [\text{Equ. 12, 13, 14}]$$

$$Q'_{weight}(Y_{max}, Z_{max}) = \int_0^{Z_{max}} \int_0^{Y_{max}} \frac{y}{(1+y^2+z^2)^2}\, dy\, dz$$

$$R'_{weight}(Y_{max}, Z_{max}) = \int_0^{Z_{max}} \int_0^{Y_{max}} \frac{z}{(1+y^2+z^2)^2}\, dy\, dz$$

In the above equations Ymax and Zmax are the maximum extents of the viewing angles projected onto the Y and Z axes as shown in FIG. 8$d$. When the above integrals are evaluated, they lead to equations 15-17 where, for brevity, Ymax and Zmax are replaced with y and z respectively and where T(s) is defined by equation 18.

$$P'_{weight}(y, z) = \frac{y \arctan\left(\frac{z}{T(y)}\right)}{2T(y)} + \frac{y \arctan\left(\frac{y}{T(z)}\right)}{2T(z)} \quad [\text{Equ. 15-17}]$$

$$Q'_{weight}(y, z) = \frac{\arctan(z)T(y) + \arctan\left(\frac{z}{T(y)}\right)}{2T(y)}$$

$$R'_{weight}(y, z) = \frac{\arctan(y)T(z) + \arctan\left(\frac{y}{T(z)}\right)}{2T(z)}$$

$$T(s) = \sqrt{(1+s^2)} \quad [\text{Equ. 18}]$$

Considering just ¼ of the pyramid by setting y=1 and z=1 in equations 19-21 yields.

$$P'_{quarter} = \frac{\sqrt{2}}{2}\arctan\left(\frac{\sqrt{2}}{2}\right) \quad [\text{Equ. 19-21}]$$

-continued $$Q'_{quarter} = \frac{\sqrt{2}}{4}\left(\frac{\sqrt{2}}{4}\pi - \arctan\left(\frac{\sqrt{2}}{2}\right)\right)$$

$$R'_{quarter} = Q'_{quarter}$$

Evaluating equations 19-21 as floats, yields P'quarter=0.4352098754, Q'quarter=R'quarter=0.1750941437. Since in this heuristic we may only be interested in the ratios of the areas, this can in turn be 'normalised' to AverageProjectedAreaquarter≈P+0.4023211640 (Q+R). This is symmetrical around the central axis, therefore the weights apply to the whole pyramid of view directions.

Figure 1E:
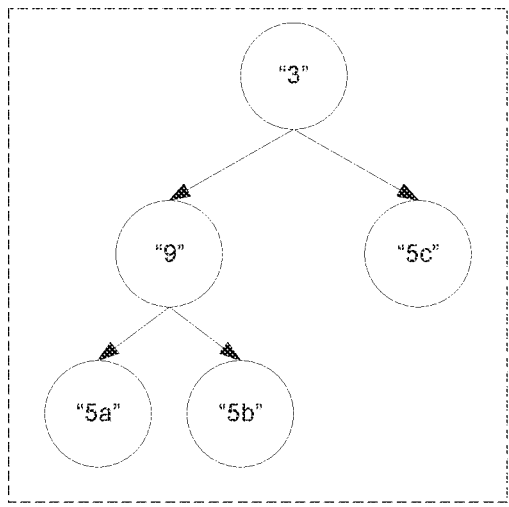
FIGS. 1e-1g show the binary hierarchies of FIGS. 1b-1d.
Figure 1F:
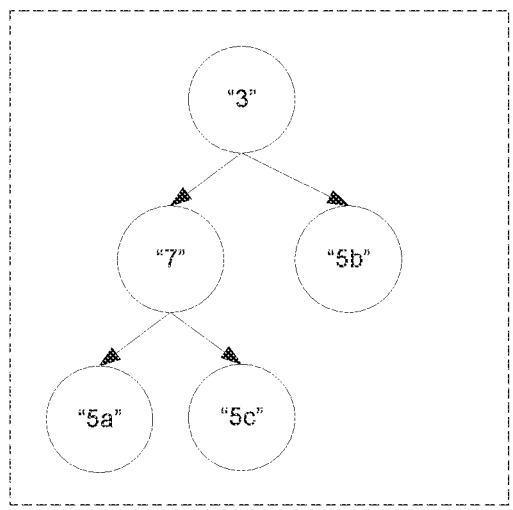
Figure 1G:
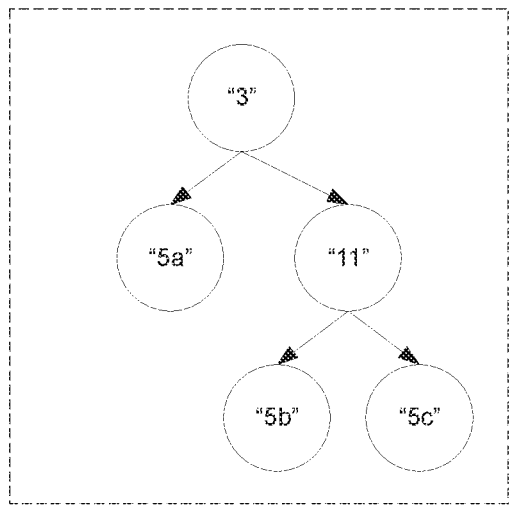
Figure 1H:
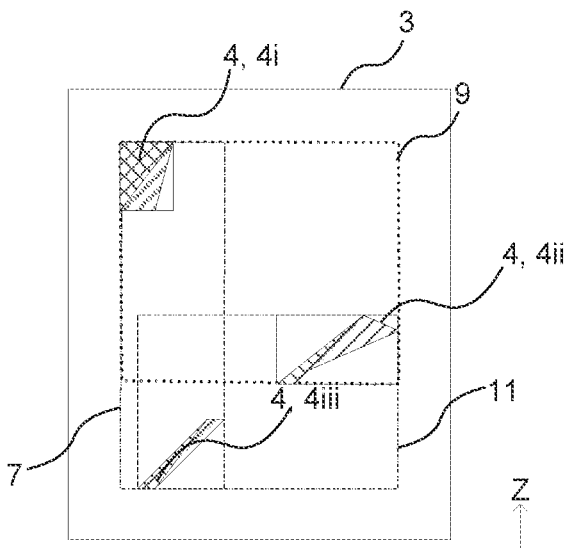
FIGS. 1h-1j show the orthographic projections of the 3D scene of FIG. 1a with the bounding boxes of FIGS. 1b-d.
Figure 1I:
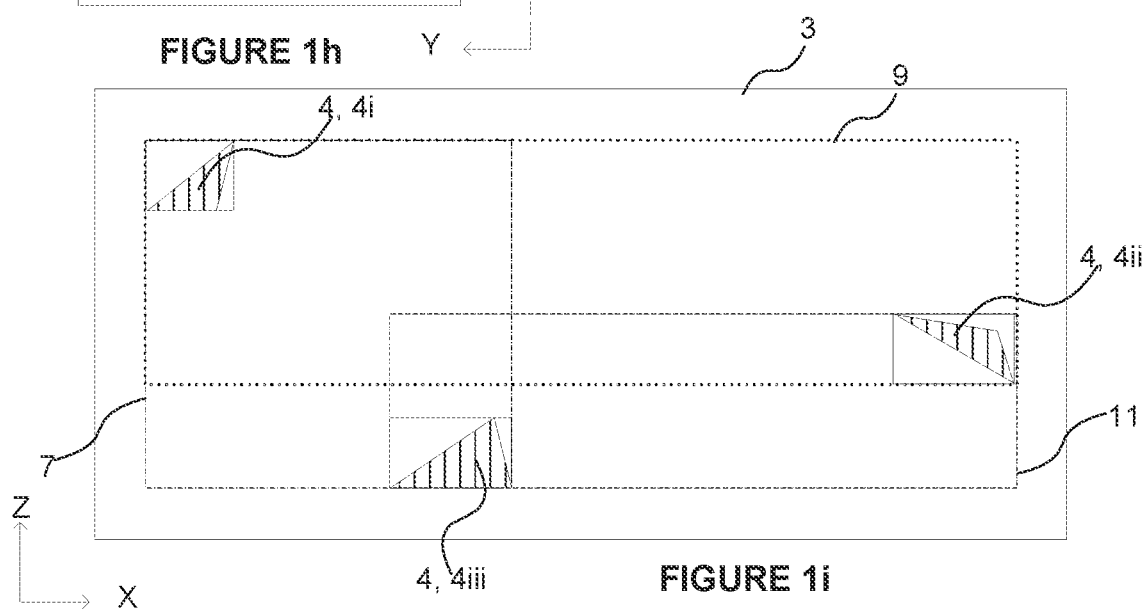
Figure 1J:
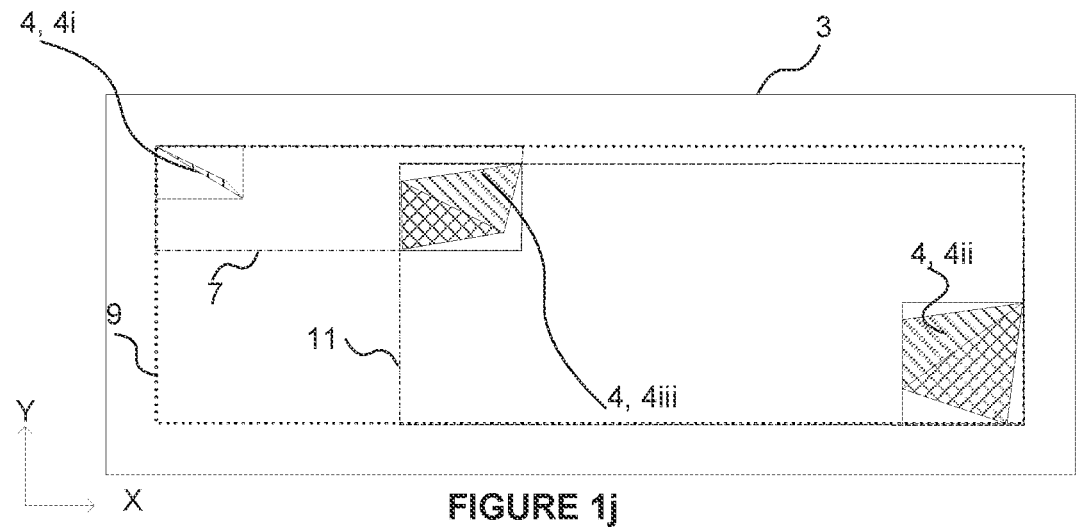

As described elsewhere above, when forming the acceleration structure, the method may select between different bounding regions 6, 8 to construct 'N' trees in anticipation of 'N' different viewing directions. For example, assuming the three subsets of ray directions identified above, then for rays that are primarily aligned with the Z axis, the relative scores using the normalised weights of equations 19-21, for the hierarchies of FIGS. 1e through 1g are 3.94, 3.30, and 3.27 respectively, thus guiding the system to choose FIG. 1f as the preferred structure for such ray directions.

When the acceleration structure is used in the ray tracing process, there will usually be rays not aligned on or close to one of these three principal axes, for example a ray or set of rays propagating into the scene 2 on, or close-to, one of the diagonals between the three principal axes, for example, similar to the vector directions 57 in FIG. 8b. For such expected rays, the method may develop a view-independent portion of the acceleration structure with a set of view-independent intermediary nodes corresponding to a set of one or more view-independent bounding regions. We may therefore think of the method using two different direction classes of expected rays that the acceleration structure is developed for. The first class corresponding to axis dominant portions of the acceleration structure for expected rays aligned along, or close in direction, to a principal axis (any of axes X, Y or Z). The second class corresponding to non-axis-dominant portions of the acceleration structure for expected rays aligned along or, close in direction to, one of the diagonals (i.e., those rays pointing at corners of the scene 2 or voxel volume in the scene 2).

In terms of sets of rays, this creates four possible sets, i.e., three for each of the areas surrounding each principal axis, and a fourth where the components, about the principal axes, are all approximately equal. Splitting the expected rays, hence viewing directions, into these groups and developing associated acceleration structures, may allow for more efficient traversal.

One approach to dividing the expected rays into these four sets is to define inner regions on a box, such as a box shown in FIG. 8d. We may first consider the set of directions (DX, DY, DZ) where $\Phi.DX \geq |DY|$ and $\Phi.DX \geq |DZ|$, for a given scalar value $\Phi$, $1 \geq \Phi > 0$, as defined by the four vectors arrows 60 in FIG. 8d. In this example of developing a heuristic, a square-based pyramid has been made as it is computationally cheaper for hardware to determine inclusion/exclusion of rays into these inner regions. Other examples of developing a heuristic may use a cone. Defining the above inequalities results in six inner regions on the box, one per face. These are grouped into opposite pairs, two for each of X, Y, and Z. These opposite pairs correspond to three of the sets of directions. The remaining surface area of the cube corresponds to the 4th (non-axis-dominant) set.

The above variable $\Phi$ is a scalar value. There now follows a discussion of choosing the value of $\Phi$ and what weights to choose for surface areas Q and R, given P is the area primarily facing the viewing direction.

Table 1 provides the normalised weights of Q and R for a given range of direction angles. In table 1, the ray has been assumed to have "x" as the major component and the weights have been normalised, so that "P" weight is 1. As table 1 shows, the narrower the range of angles about the principal axis X, the less the weights are for the adjacent sides Q and R in the SAH.

TABLE 1

| Possible $\Phi$ values | "Normalised" Q & R Weight | Angle from principal axis to diagonal | Angle in Aligned plane |
|---|---|---|---|
| $9/10 \; |D_x| \geq$ max( $|D_y|, |D_z|$) | 0.3734315714 | 51.8° | 41.8° |
| $8/10 \; |D_x| \geq$ max( $|D_y|, |D_z|$) | 0.3421841152 | 48.6° | 38.7° |
| $3/4 \; |D_x| \geq$ max( $|D_y|, |D_z|$) | 0.3256197401 | 46.8° | 36.9° |
| $1/2^{0.5}$ | 0.3108884613 | 45.000° | 35.3° |
| $7/10$ | 0.3084003047 | 44.5° | 35.1° |
| $2/3$ | 0.2965475176 | 43.6° | 33.5° |
| $1/2$ | 0.2326550821 | 35.3° | 26.3° |
| $1/3$ | 0.1610182341 | 25.0° | 18.5° |
| $1/4$ | 0.1225269588 | 20.0° | 14.6° |

When determining the optimal value of $\Phi$, that the 'ideal' transition point may be the point where each of the above-mentioned four sets of rays all enclose the same total 'sum' of directions/solid angles. One way of visualising this is to contemplate the "areas" covered on a unit sphere 65 (see FIG. 8e) by each of the "closest to" X, Y and Z regions, which are labelled 67, 69, 71 respectively, and the remaining area 73. If the areas of these 4 sets are equal or approximately equal, then each alternative branch of the acceleration structure (respectively corresponding to expected rays primarily along X, Y, Z and the diagonal) may be used equally often when performing intersection testing, thus providing a hierarchical acceleration structure with alternative branches that are balanced with respect to their usage when rays traverse the scene 2.

Figure 8E:
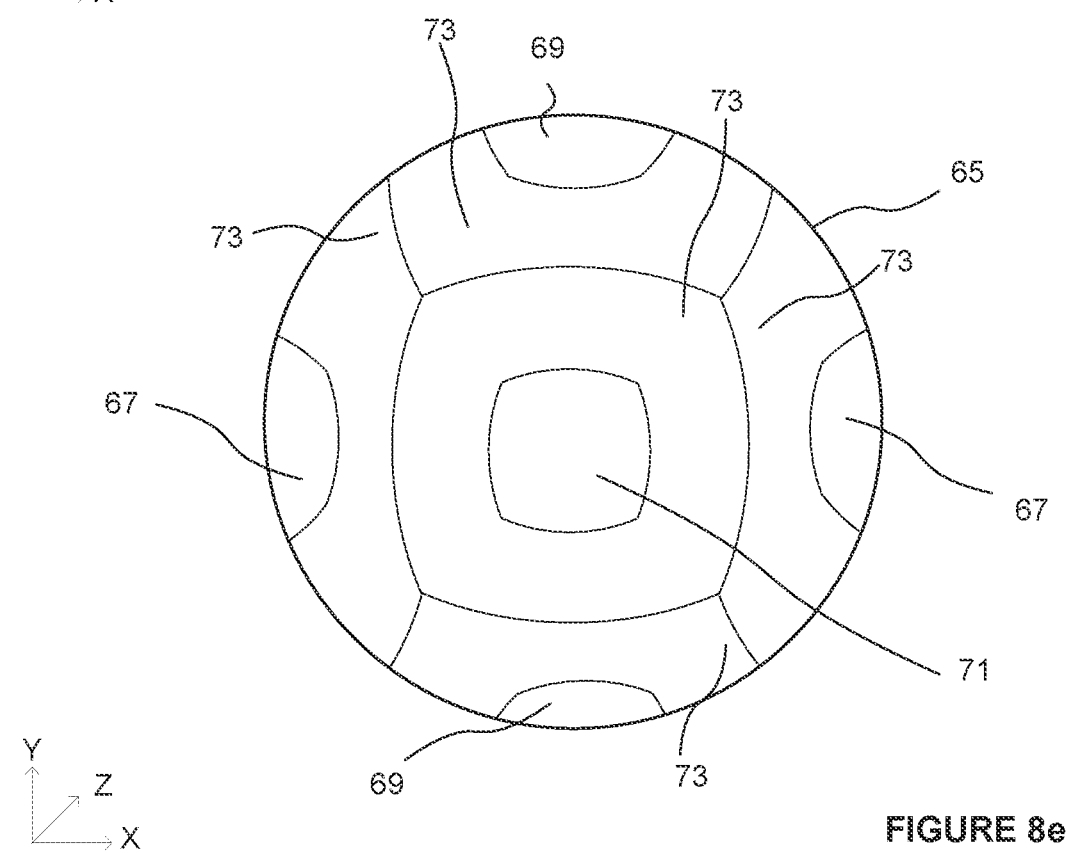
FIG. 8e shows a visualisation contemplating the "areas" covered on a unit sphere.

Projecting the six faces onto a unit sphere (as shown in FIG. 8e), allows us to subdivide the faces into three groups of: a) the two X axis faces 67; b) the two Y axis faces 69; c) the two Z axis faces 71 (wherein only one is visible in FIG. 8e) and a fourth group of "nondirectional" or "excluded" regions represented by the six remaining areas on the unit sphere not taken by the previous three groups. The optimal situation for balancing the branches of the acceleration structure is given by equations 22 and 23.

$$2\text{Area}_x = \text{Area}_y = 2\text{Area}_z = 6\text{Areae}_{xcluded} \quad \text{Equ. 22}$$

$$\text{Area}_x = 3\text{Area}_{excluded} \quad \text{[Equ. 23]}$$

Equations 22 and 23 may therefore imply that included Area(x) should make up 3/4s the area of a projected square and, since each face corresponds to 1/6th of surface area the unit sphere which has an area of 4/6 $\pi$, the projected are for Area(x) should be $\pi/2$.

To compute the area for $\Phi$, we turn back to equations 7 and 8, which can be evaluated to equation 24.

$$SphericalQtrArea(y_{max}, z_{max}) = \arctan\left(\frac{y_{max} \cdot z_{max}}{\sqrt{1 + y_{max}^2 + z_{max}^2}}\right) \quad \text{[Equ. 24]}$$

In the above discussion the included regions for expected rays in the principal axis group are square which means we solve for $\phi$ given the following conditions set out in equations 25-28.

$$4SphericalQtrArea(\phi, \phi) = \frac{\pi}{2} \quad \text{[Equ. 25-28]}$$

$$\Leftrightarrow 4 \arctan\left(\frac{\phi^2}{\sqrt{1 + 2\phi^2}}\right) = \frac{\pi}{2}$$

$$\Leftrightarrow \frac{\phi^2}{\sqrt{1 + 2\phi^2}} = \tan\left(\frac{\pi}{8}\right)$$

$$\Leftrightarrow \phi^2 = \tan\left(\frac{\pi}{8}\right)\sqrt{1 + 2\phi^2}$$

By squaring both sides and substituting $s=\phi^2$ we obtain equations 29-32.

$$s^2 = \tan^2\left(\frac{\pi}{8}\right)(1 + 2s) \quad \text{[Equ. 29-32]}$$

$$\Leftrightarrow 0 = s^2 - 2\tan^2\left(\frac{\pi}{8}\right)s - \tan^2\left(\frac{\pi}{8}\right)$$

$$\Leftrightarrow s = \frac{2\tan^2\left(\frac{\pi}{8}\right) \pm \sqrt{4\tan^4\left(\frac{\pi}{8}\right) + 4\tan^2\left(\frac{\pi}{8}\right)}}{2}$$

$$\Leftrightarrow s = \tan^2\left(\frac{\pi}{8}\right) \pm \sqrt{\tan^4\left(\frac{\pi}{8}\right) + \tan^2\left(\frac{\pi}{8}\right)}$$

Then by assuming a positive real value for P we obtain equation 33.

$$\phi = \sqrt{\tan^2\left(\frac{\pi}{8}\right) + \sqrt{\tan^4\left(\frac{\pi}{8}\right) + 4\tan^2\left(\frac{\pi}{8}\right)}} \quad \text{[Equ. 33]}$$

Using equation 33, an expected optimum value of the Q+R weightings for the SAH may be calculated. The above evaluates to $\Phi$~=0.7873, corresponding to an angle of ≈47.9 degrees between the central axis (for example axis X) and the diagonal. Using this value of $\Phi$ provides an ideal SAH between 0.3-0.5. An example of an optimum SAH may be: P+0.40232(Q+R).

Thus, when generating the acceleration structure and determining the axis dominant and axis non-dominant data for the alterative bounding regions 6, 8, there may therefore be a set of multiple ray angles to associate with the data as discussed above and shown in FIG. 8b, for example surface heuristic data for expected rays within a 45-degree cone centred about the X axis. Furthermore, as previously discussed, further direction-optimised data may be determined for the same or other sets of regions 6, 8, for example surface heuristic data for expected rays within a 45-degree cone centred about the Z axis. For these two sets or ranges of expected rays, the centre or average direction of a first range of rays may be orthogonal to a centre or average direction of a second range of rays, for example an average ray angle in a cone of rays centred along the X axis is an angle along the X axis and an average ray angle in a cone of rays centred along the Z axis is an angle along the Z axis. The rays angle range may be any range, for example any of: 0-45 degrees from a central ray angle in the 3D scene, 0-30 degrees from a central ray angle in the 3D scene; 0-15 degrees from a central ray angle in the 3D scene; 0-10 degrees from a central ray angle in the 3D scene; 0-5 degrees from a central ray angle in the 3D scene. The different ranges of hypothetical ray angles used to calculate the different surface area heuristics of the different primary directions (e.g., centred on the X axis and Z axis, as discussed above) may be different and not overlap, i.e., all of a first range of directions may be different to any of the directions in a second range of directions.

There now follows a discussion on how the method may further be adapted or varied. Any of these optional features or configurations may be used in combination with any of the examples described above. Furthermore, any of features of configurations used in any of the above examples may be used in other examples described herein.

Figure 8F:
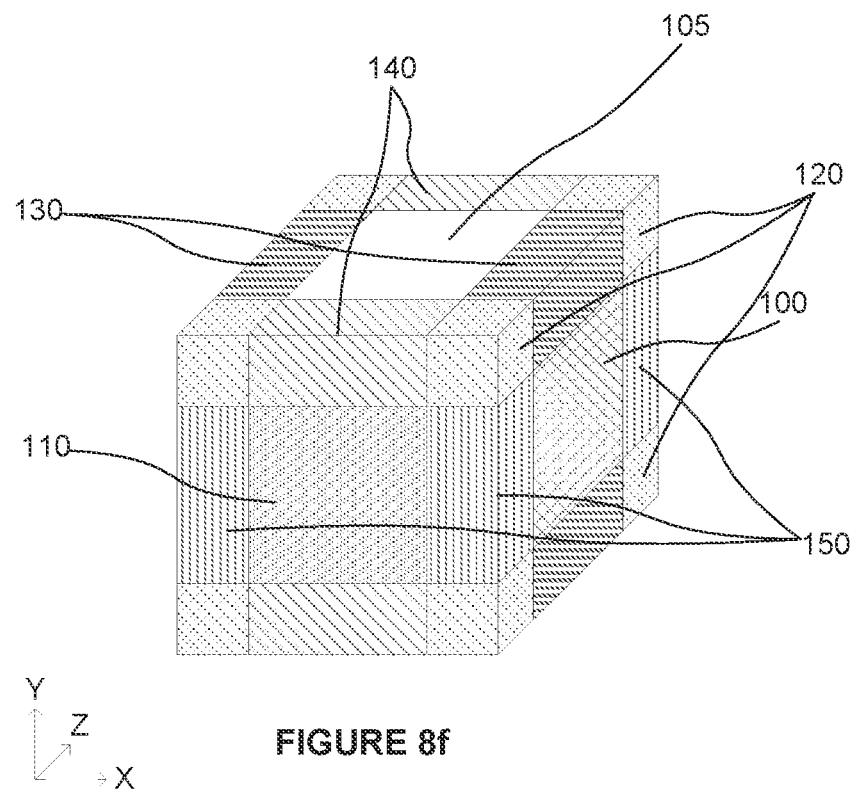
FIG. 8f shows ray directions having been grouped into seven sets as areas on the surface of a cube.

In the example of FIG. 8f, ray directions have been grouped into seven sets as shown as areas on the surface of a cube. Areas 100, 105 and 110 correspond to ray directions that are more closely aligned with the X, Y and Z axes respectively, i.e., subsets of those described previously with respect to FIG. 8b. The eight cube corner regions, 120, correspond to ray directions whose X, Y, and Z components are nearly equal, i.e., a subset of the ray directions of the "non-axis-aligned" set corresponding to FIG. 8d. Three additional sets are identified. Set 130 correspond to sets of rays where the X & Y ray components have a relatively large magnitude compared to Z component. Similarly, set 140 are for rays with large magnitude Y & Z but small X, and finally, set 150 which for rays with small Y ray direction components. The ideal sizes would again be determined such that each set has the same solid angle and can be determined via optimisation and the definite integrals presented earlier.

Figure 8G:
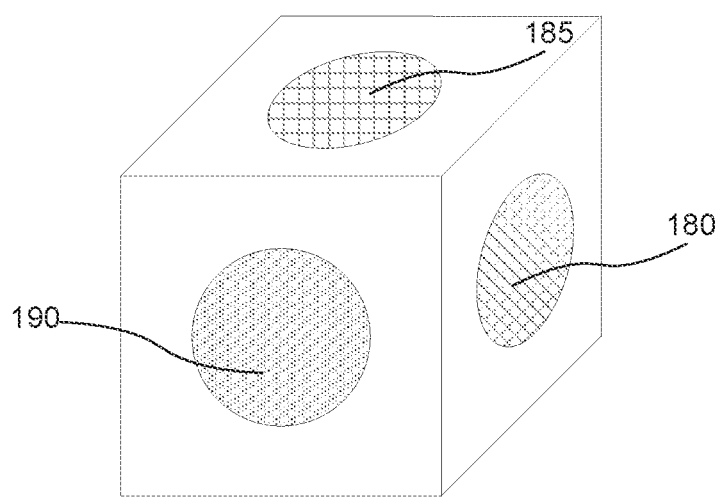
FIG. 8g shows ray directions split into four sets using cones to classify ray directions.

In the example of FIG. 8g, like 8d, the ray directions are split into 4 sets, but rather than using pyramids, cones are used to classify ray directions, leading to a circular footprint, 180, corresponding to rays primarily in the X direction and, similarly, 185 and 190, corresponding to rays principally in the Y and Z directions, respectively. The remainder are again classed as "non-axis-aligned.

The 3D scene 2 may be a single 3D scene or part of a set of 3D scenes forming a moving image sequence. The 3D scene shown in the above figures is a box, however other scene shapes and sizes may be used for the 3D scene 2.

The first 6 and further 8 regions that bound the primitives 4 and are compared by the method, may be of any shape or size. The method is not limited to only comparing two regions 6, 8 or two sets of regions 6a/6b, 8a/8b. Three or more regions may be compared, or three or more sets of regions may be compared. The bounding regions 6, 8 may bound other bounding regions such as leaf node bounding regions 50. The bounding regions 6, 8 may be the bounding regions defining a leaf node. The bounding regions 6, 8 may have sides and edges that coincide with parent or child bounding regions (i.e., the regions 6, 8 may be flush to other bounding regions), or they may be spaced apart from parent or child bounding regions.

The regions 6, 8 may use an underlying subdivision of the scene 2 to guide the creation of the bounding regions 6, 8, such as the voxels shown in FIG. 7a, however the method may not require any underlying subdivision. The underlying structure subdivision may not be limited to AABB's but could be any subdivision of the scene into portions, for example wedge shapes or pyramid shapes.

The hierarchical acceleration structure may create a single bounding region 6, 8 for a branch at a node level within its structure or it may create multiple nodes using the above method. The hierarchical acceleration structure may create alternative nodes along alternative branches that may be used by the ray tracing system, for example alternative nodes for different directions.

The data used to compare bounding regions may be any data. Surface area data is used in the above examples, however other data may be used including volume of the bounding regions or depth of the bounding region 6, 8 along the respective direction. This may be useful data to compare regions with if the objects or primitives in the scene have a degree of transparency.

Primitives 4 are commonly triangles may be of any shape or size, including any of: lines, points, 2D shapes or 3D shapes, such as but not limited to: boxes, spheres, pyramids. The primitives may be procedural primitives which are programmatically defined primitives that may be complex and/or 3D shapes. Objects in the 3D scene may be formed from one or more primitives 4. The bounding regions 6, 8 may bound a whole object or may bound part of an object.

When using the acceleration structure, the system may test a single ray against the acceleration structure or a set of rays against the same structure. These sets of rays may be bunched according to a common direction or common range of direction and/or common position.

Figure 9:
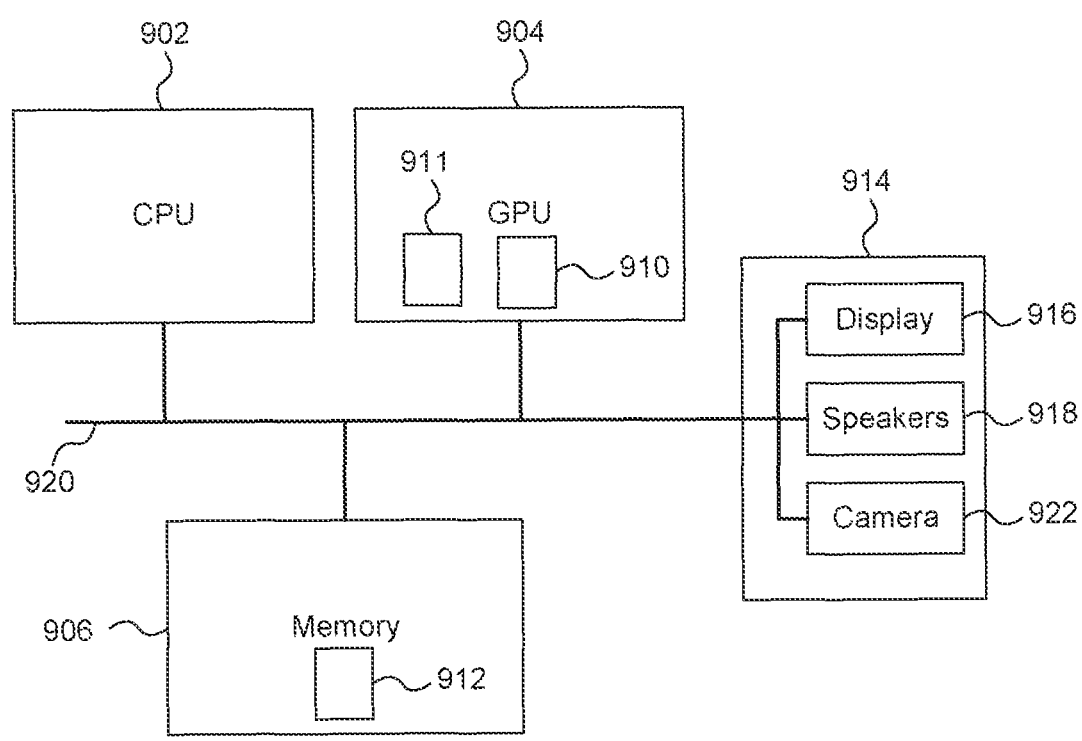
FIG. 9 shows a computer system in which a graphics processing system is implemented.

FIG. 9 shows a computer system in which the graphics processing systems described herein may be implemented. The computer system comprises a CPU 902, a GPU 904, a memory 906 and other devices 914, such as a display 916, speakers 918 and a camera 922. A processing block 910 is implemented on the GPU 904, as well as a Neural Network Accelerator (NNA) 911. In other examples, the processing block 910 may be implemented on the CPU 902 or within the NNA 911. The components of the computer system can communicate with each other via a communications bus 920. A store 912 is implemented as part of the memory 906.

While FIG. 9 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA) 911, or by adding the NNA as a separate unit. In such cases, again, the processing block 910 can be implemented in the NNA.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e., run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g., providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 10.

Figure 10:
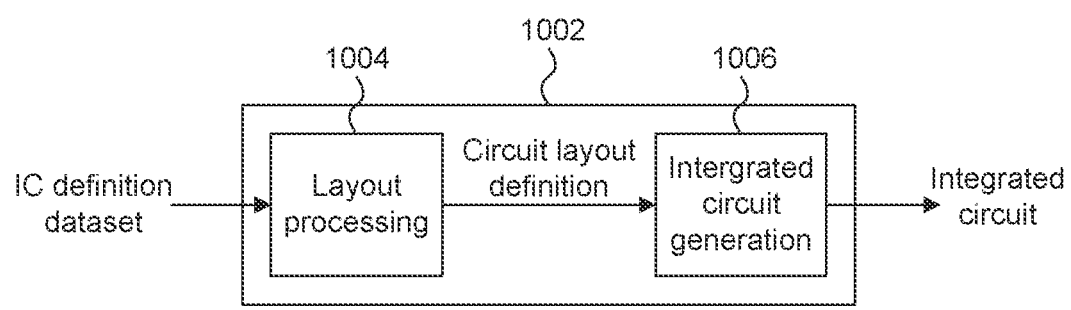
FIG. 10 shows an integrated circuit manufacturing system for generating an integrated circuit embodying a graphics processing system.

FIG. 10 shows an example of an integrated circuit (IC) manufacturing system 1002 which is configured to manufacture a graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g., defining a graphics processing system as described in any of the examples herein), process the IC definition dataset, and generate an IC according to the IC definition dataset (e.g., which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g., in terms of logical components (e.g., NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g., by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g., by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g., in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description, it will be evident to a person skilled in the art that various modifications may be made within the scope of the invention.

What is claimed is:

1. A computer-implemented method for traversing a ray in a ray tracing system for rendering an image of a 3D scene, wherein the ray tracing system uses a hierarchical acceleration structure which includes:
   a first node at a first node level, the first node associated with a first portion of the 3D scene, the first portion of the 3D scene comprising a first set of one or more regions including a first region comprising one or more primitives in the 3D scene;
   a second node at the first node level, the second node associated with a further portion of the 3D scene, the further portion of the 3D scene comprising a second set of one or more regions including a further region comprising one or more primitives in the 3D scene, the further region overlapping the first region and bounding a different volume of the 3D scene than the first region;
   the method comprising:
   I) selecting a ray for traversing through the 3D scene; the ray comprising a ray direction with respect to the 3D scene;
   II) selecting the first node or the second node based on comparing the ray direction with:
      a) direction data associated with the first node; and,
      b) direction data associated with the second node;
   III) traversing the ray through the portion of the 3D scene associated with the selected first or second node; and,
   IV) determining whether the ray intersects the set of one or more regions associated with the selected first or second node.

2. The computer-implemented method as claimed in claim 1, wherein the first and further regions comprise a common primitive of the 3D scene.

3. The computer-implemented method as claimed in claim 2, wherein each of the first and further regions bound the common primitive.

4. The computer-implemented method as claimed in claim 1, wherein:
   the direction data associated with the first node comprises a first direction;
   the direction data associated with the second node comprises a second direction; and
   the first direction is orthogonal to the second direction.

5. The computer-implemented method as claimed in claim 1, wherein:
   a) the direction data associated with the first node comprises data associated with a first range of directions;
   b) the direction data associated with the second node comprises data associated with a second range of directions; the first range of directions is different to the second range of directions; and
   C) selecting between first node or the second node comprises determining whether the ray direction is within the first range of directions or the second range of directions.

6. The computer implemented method as claimed in claim 5, wherein the first and second range of directions each comprises a cone of directions.

7. The computer-implemented method as claimed in claim 5, wherein a center or average direction of the first range is orthogonal to a centre or average direction of the second range.

8. The computer-implemented method as claimed in claim 5, wherein all of the directions of the first range of directions are different to any of the directions in the second range of directions.

9. The computer-implemented method as claimed in claim 1, wherein the first portion of the 3D scene occupies the same volume of the 3D scene as the further portion of the 3D scene.

10. The computer-implemented method as claimed in claim 1, wherein the first set of regions comprises the first region and a second region comprising one or more primitives in the 3D scene; and
    the second set of regions comprises:
    a third region, the third region comprising the further region; and
    a fourth region comprising one or more primitives in the 3D scene.

11. The computer-implemented method as claimed in claim 10, wherein the first set of regions bound the same primitives as the second set of regions.

12. The computer-implemented method as claimed in claim 1, wherein:
    the further portion of the 3D scene is a first further portion, and
    the hierarchical acceleration structure further comprises:
       a third node at the first node level, the third node associated with a portion of the 3D scene; the portion of the 3D scene, associated with the third node, comprising a third set of one or more regions including region comprising one or more primitives in the 3D scene; the region of the third set overlapping the first region and second region; and
    the method further comprising selecting one of the first node, second node and third node, based on comparing the ray direction with:
       the direction data associated with the first node;
       the direction data associated with the second node; and
       direction data associated with the third node;
    wherein:
       the direction data associated with the first node comprises a first direction;
       the direction data associated with the second node comprises a second direction;
       the direction data associated with the third node comprises a third direction; and
       the first, second and third directions are orthogonal to each other.

13. The computer-implemented method as claimed in claim 12, wherein:
    the hierarchical acceleration structure further comprises:
    a fourth node at the first node level, the fourth node associated with a portion of the 3D scene, the portion of the 3D scene, associated with the fourth node, comprising a fourth set of one or more regions including region comprising one or more primitives in the 3D scene, and
    the region of the fourth set overlapping the first, second and third regions; and
    the method further comprising selecting one of the first node, second node, third node and fourth node based on comparing the ray direction with:
       the direction data associated with the first node;
       the direction data associated with the second node;

the direction data associated with the third node; and direction data associated with the fourth node;

wherein the fourth node is a view-independent node.

14. The computer-implemented method as claimed in claim 13, wherein the method further comprises selecting the fourth node if the ray direction is outside of any acceptable ranges for the first node, second node and third node.

15. The computer-implemented method of claim 1, wherein the hierarchical acceleration structure comprises a tree structure wherein:

the first node is on a first branch associated with a first direction, and the second node is on a second branch associated with a second direction.

16. The computer-implemented method of claim 15, wherein the tree structure comprises leaf nodes, wherein each leaf node:

a) bounds one or more primitives; and, b) is linked to both:

the first node on the first branch; and the second node on the second branch.

17. The computer-implemented method as claimed in claim 1, wherein the first and further regions are Axis Aligned Bounding Boxes (AABBs).

18. A graphics processing system configured to perform the method as set forth in claim 1.

19. The graphics processing system of claim 18, wherein the graphics processing system is embodied in hardware on an integrated circuit.

20. A method of manufacturing, using an integrated circuit manufacturing system, a graphics processing system as set forth in claim 18, comprising inputting to said integrated circuit manufacturing system a computer-readable dataset description of said graphics processing system, which causes said integrated circuit manufacturing system to manufacture said graphics processing system.

* * * * *